United States Patent
Park et al.

(10) Patent No.: US 10,073,660 B2
(45) Date of Patent: Sep. 11, 2018

(54) MEMORY SYSTEM FOR PERFORMING FAIL BIT CHECK OPERATION AND OPERATING METHOD OF THE SAME

(71) Applicant: SK hynix Inc., Gyeonggi-do (KR)

(72) Inventors: Byoung Jun Park, Chungcheongbuk-do (KR); Seong Jo Park, Chungcheongnam-do (KR); Kang Jae Lee, Chungcheongbuk-do (KR)

(73) Assignee: SK Hynix Inc., Gyeonggi-do (KR)

( * ) Notice: Subject to any disclaimer, the term of this patent is extended or adjusted under 35 U.S.C. 154(b) by 44 days.

(21) Appl. No.: 15/299,205

(22) Filed: Oct. 20, 2016

(65) Prior Publication Data
US 2017/0371575 A1 Dec. 28, 2017

(30) Foreign Application Priority Data
Jun. 27, 2016 (KR) .......... 10-2016-0080266

(51) Int. Cl.
*G06F 3/06* (2006.01)
*G06F 11/08* (2006.01)
*G06F 12/02* (2006.01)

(52) U.S. Cl.
CPC .......... *G06F 3/0679* (2013.01); *G06F 3/064* (2013.01); *G06F 3/0614* (2013.01); *G06F 3/0659* (2013.01); *G06F 11/08* (2013.01); *G06F 12/0246* (2013.01)

(58) Field of Classification Search
CPC ...... G06F 3/0619; G06F 3/064; G06F 3/0649; G06F 3/0659; G06F 3/0679; G06F 11/004; G06F 11/08
See application file for complete search history.

(56) References Cited

U.S. PATENT DOCUMENTS

| | | | | |
|---|---|---|---|---|
| 9,613,708 | B1* | 4/2017 | Hsieh | G11C 16/26 |
| 9,772,901 | B2* | 9/2017 | Hoekstra | G06F 11/1068 |
| 2014/0237165 | A1* | 8/2014 | Seo | G06F 12/0246 711/103 |
| 2015/0074476 | A1* | 3/2015 | Kim | G11C 29/44 714/723 |
| 2015/0324148 | A1* | 11/2015 | Achtenberg | G06F 11/1012 711/103 |
| 2015/0364199 | A1* | 12/2015 | Kang | H01L 27/10823 714/764 |

(Continued)

FOREIGN PATENT DOCUMENTS

| | | |
|---|---|---|
| KR | 1020110121897 | 11/2011 |
| KR | 1020120077285 | 7/2012 |

*Primary Examiner* — Hal Schnee
(74) *Attorney, Agent, or Firm* — IP & T Group LLP

(57) ABSTRACT

Provided herein are a memory system and method of operating the memory system, which have improved reliability. A method of operating a controller for controlling a semiconductor memory device including a plurality of memory blocks, the method comprising generating a program command and a program address for performing a program operation on at least one page included in an open block, among the plurality of memory blocks, reading data from the at least one page corresponding to the program address and transmitting the program command and the program address to the semiconductor memory device when the number of fail bits included in data read from the at least one page is equal to or less than a first reference value.

18 Claims, 13 Drawing Sheets

(56) References Cited

U.S. PATENT DOCUMENTS

2016/0283308 A1* 9/2016 Earhart .................. G06F 11/08
2016/0328286 A1* 11/2016 Hoekstra ............. G06F 11/1068
2018/0011642 A1* 1/2018 Koseki ................. G06F 3/0616

* cited by examiner

MEMORY SYSTEM FOR PERFORMING FAIL BIT CHECK OPERATION AND OPERATING METHOD OF THE SAME

CROSS-REFERENCE TO RELATED APPLICATION

The present application claims priority under 35 U.S.C. § 119(a) to Korean patent application number 10-2016-0080266 filed on Jun. 27, 2016, which is herein incorporated by reference in its entirety.

BACKGROUND

Field of Invention

Various embodiments of the present disclosure relate to electronic devices, and more particularly, to a memory system and method of operating the memory system.

Description of Related Art

A memory system has been widely used as a data storage device for digital appliances, such as a computer, a digital camera, an MP3 player, and a smart phone. Such a memory system may include a semiconductor memory device for storing data and a controller for controlling the memory device. The digital appliances act as a host for the memory system, and the controller transmits commands and data between the host and the semiconductor memory device.

Semiconductor memory devices are realized using semiconductor such as silicon (Si), germanium (Ge), silicon germanium (SiGe), gallium arsenide (GaAs), indium phosphide (InP), or the like. Semiconductor memory devices are classified into volatile memory devices and nonvolatile memory devices.

A volatile memory device may lose data stored therein when power is turned off. Representative examples of a volatile memory device include a static RAM (SRAM), a dynamic RAM (DRAM), and a synchronous DRAM (SDRAM). A nonvolatile memory device retains the stored data even when power is turned off. Representative examples of a nonvolatile memory device include a read-only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), and a ferroelectric RAM (FRAM). The flash memory may be a NOR type flash memory or a NAND type flash memory.

SUMMARY

Various embodiments of the present disclosure are directed to a memory system with improved reliability, and a method of operating the memory system.

One embodiment of the present disclosure provides a method of operating a controller, the method of operating a controller for controlling a semiconductor memory device including a plurality of memory blocks, the method comprising generating a program command and a program address for performing a program operation on at least one page included in an open block, among the plurality of memory blocks, reading data from the at least one page corresponding to the program address and transmitting the program command and the program address to the semiconductor memory device when the number of fail bits included in data read from the at least one page is equal to or less than a first reference value.

Another embodiment of the present disclosure provides a controller for controlling a semiconductor memory device including a plurality of memory blocks, the controller comprising a memory block management unit configured to manage memory block state information indicating states of the memory blocks and a processor configured to perform, based on the memory block state information, a fail bit check operation on an open block, among the memory blocks, before and/or after performing a program operation on at least one page included in the open block.

A further embodiment of the present disclosure provides a method of operating a memory system, including performing, before performing a program operation, a first fail bit check operation on at least one page included in an open block to be programmed, performing the program operation on the open block based on a result of the first fail bit check operation, performing a second fail bit check operation on at least one programmed page that is programmed in the program operation and moving data of the memory block to a memory block other than the open block based on a result of the second fail bit check operation.

BRIEF DESCRIPTION OF THE DRAWINGS

The above and other features and advantages of the present invention will become more apparent to those skilled in the art to which the present invention belongs by describing in detail various embodiments thereof with reference to the attached drawings in which.

DETAILED DESCRIPTION

Figure 1:
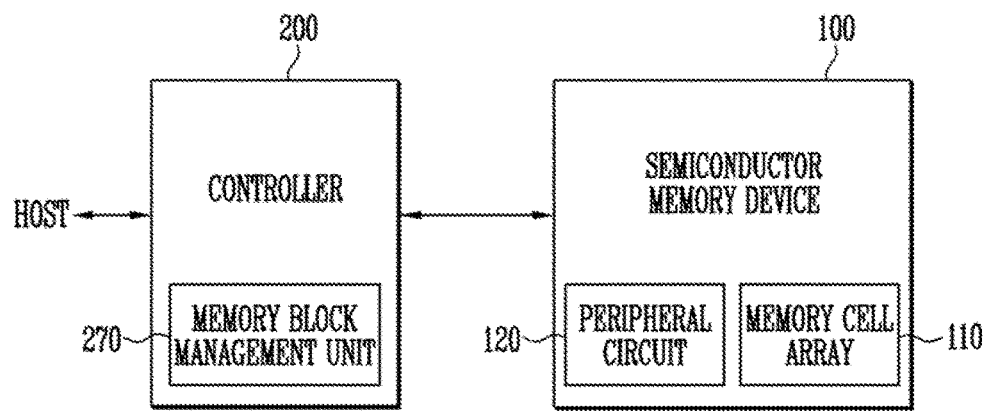
FIG. 1 is a block diagram showing a memory system, according to an embodiment of the present disclosure.

Although the present invention is described via specific embodiments thereof, it should be understood that the present invention may be embodied in different forms and should not be construed as being limited only to the described embodiments set forth herein. Rather, these embodiments are provided so that this disclosure will be thorough and complete, and will fully convey the present invention to those skilled in the art to which the present invention pertains.

The drawings are simplified schematics, and as such well-known details may be omitted. Also, in the drawings, dimensions may be exaggerated for clarity of illustration. Variations from the shapes of the illustrations as a result, for example, of manufacturing techniques and/or tolerances, are to be expected. Thus, embodiments should not be construed as being limited to the particular shapes of regions illustrated herein but may include deviations in shapes that result, for example, from manufacturing.

Like reference numerals refer to like elements throughout.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure.

It will be further understood that when an element is referred to as being "between" two elements, it can be the only element between the two elements, or one or more intervening elements may also be present.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

Spatially relative terms, such as "under," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in manufacturing, use or operation in addition to the orientation depicted in the figures. For example, if the device in the figures is turned over, elements described as "below" or "under" other elements or features would then be "above" the other elements or features. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention.

It will be further understood that the terms "comprises," "comprising," "includes," and "including" when used in this specification, specify the presence of the stated elements and do not preclude the presence or addition of one or more other elements.

Unless otherwise defined, all terms including technical and scientific terms used herein have the same meaning as commonly understood by one of ordinary skill in the art to which the present invention belongs in view of the present invention. It will be further understood that terms, such as those defined in commonly used dictionaries, should be interpreted as having a meaning that is consistent with their meaning in the context of the present invention and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been included in the drawings and/or have not been described in detail in order not to unnecessarily obscure the present invention.

It is also noted, that in some instances, as would be apparent to those skilled in the art to which the present invention pertains, an element (also referred to as a feature) described in connection with one embodiment may be used singly or in combination with other elements of another embodiment unless specifically indicated otherwise.

Here, embodiments of the present invention will be described in detail with reference to the accompanying drawings.

FIG. 1 is a block diagram showing a memory system according to an embodiment of the present invention.

Referring to FIG. 1, the memory system includes a semiconductor memory device 100 operatively coupled to a controller 200.

The semiconductor memory device 100 may take many alternative forms, such as a NAND flash memory, vertical NAND flash memory, a NOR flash memory device, a resistive random access memory (RRAM), a phase-change memory (PRAM), a magnetoresistive random access memory (MRAM), a ferroelectric random access memory (FRAM), or a spin transfer torque random access memory (STT-RAM), for example. In addition, the semiconductor memory device 100 in the memory system according to an embodiment of the present disclosure may be implemented as a three-dimensional array structure. The present disclosure may also be applied not only to a flash memory in which a charge storage layer is implemented as a conductive floating gate (FG), but also to a charge trap flash (CFT) memory in which a charge storage layer is implemented as an insulating layer.

The semiconductor memory device 100 includes a memory cell array 110 and a peripheral circuit 120 operatively coupled to the memory cell array 110 for driving the memory cell array 110. The memory cell array 110 includes a plurality of nonvolatile memory cells for storing data.

The peripheral circuit 120 is operatively coupled to the controller 200 and operates under the control of the controller 200. The peripheral circuit 120 may perform a program operation for storing data in the memory cell array 110 under the control of the controller 200. The peripheral circuit 120 may perform a read operation for reading data from the memory cell array 110 and transferring the read data to the controller 200. The peripheral circuit 120 may perform an erase operation for erasing data stored in the memory cell array 110.

The read operation and the program operation of the semiconductor memory device 100 may be performed on a page basis. The erase operation of the semiconductor memory device 100 may be performed on a memory block basis. In an embodiment the semiconductor memory device may be a NAND flash memory In a program operation, the peripheral circuit 120 may receive a command indicating a program operation, a physical block address PBA, and write data from the controller 200. The peripheral circuit 120 may program the received write data in a selected page in a selected single page in a single memory block which are selected based on the physical block address PBA.

In a read operation, the peripheral circuit 120 may receive a command indicating a read operation (hereinafter referred to as a "read command") and a physical block address PBA from the controller 200 indicating a physical memory location from where the data are to be read. The peripheral circuit 120 may read data from a single memory block and from a page included in the memory block selected based on the physical block address PBA, and may output the read data to the controller 200.

In an erase operation, the peripheral circuit 120 may receive a command indicating an erase operation and a physical block address PBA from the controller 200 specifying a single memory block. The peripheral circuit 120 may then erase all the data which are stored in the memory selected memory block based on the physical block address PBA.

The controller 200 controls the operations of the semiconductor memory device 100. The controller 200 may access the semiconductor memory device 100 in response to a request received from an external host and may provide a command to the semiconductor memory device 100 based on received request from the external host.

The controller 200 may control the semiconductor memory device 100 so that a program operation, a read operation or an erase operation is performed. In a program operation, the controller 200 may provide a program command, write data and an address for the write data to the semiconductor memory device 100 through a first channel. In a read operation, the controller 200 may provide a read command and an address to the semiconductor memory device 100 through a second channel. In the erase operation, the controller 200 may provide the erase command and the address to the semiconductor memory device 100 through a third channel. The first, second and third channels may be the same channel. Alternatively, the first, second and third channels may be different channels, wherein the first channel is dedicated for the write operation, the second channel is dedicated for the read operation and the third channel is dedicated for the erase operation.

The controller 200 may further include a memory block management unit 270. In a program operation, the controller 200 generates a program command and a program address where the write data received from the host are to be stored in response to a request from an external host. The controller 200 may generate the program address based on memory block information included in the memory block management unit 270.

The memory block management unit 270 may include memory block information indicating the states of a plurality of memory blocks included in the memory cell array 110 of the semiconductor memory device 100. For example, the memory block information may include information of at least one of bad block information, open block information indicating information about memory blocks having residual data storage space, free block information indicating information about memory blocks in which no data is stored, and closed block information indicating information about memory blocks which are completely written and therefore have no residual available storage space.

The controller 200 may generate a program address for storing data in a memory block corresponding to an open block or a free block based on the memory block information included in the memory block management unit 270.

A single memory block may include a plurality of pages. As program operations for storing data in a memory block are performed, pages in which data is written and pages in which data is not written may coexist in a single memory block. In particular, when a single memory cell is implemented as a triple level cell (TLC) in which three data bits are stored, open blocks may continuously occur. When a program operation is performed on an open block, the number of Program/Erase (P/E) cycles may be used or, a program operation based on a complex algorithm may be required to secure the reliability of a memory device.

In an embodiment of the present disclosure, a fail bit check operation may be performed on a page, which is programmed or is about to be programmed, before and/or after performing a program operation on an open block, thus enabling the reliability of the open block to be guaranteed. In an embodiment of the present disclosure, when the number of fail bits which are included in a programmed page or in a page about to be programmed is greater than a preset reference number, the corresponding memory block including the page is set as a closed block or a bad block. This way the reliability of open blocks is improved.

The memory system may perform at least one fail bit check operation before or after a program operation is performed. The memory system may perform a fail bit check operation on at least one page to be programmed before performing a program operation and perform a fail bit check operation on at least one programmed page after a program operation is performed.

The controller 200 may update memory block information included in the memory block management unit 270 depending on the result of the fail bit check operation. For example, the memory block information may be updated so that a memory block, completely programmed to have no available space, is included in a closed block information. Further, the controller 200 may update memory block information so that a memory block, in which the number of fail bits is greater than the reference value, is included in a bad block information. Further, the controller 200 may update memory block information so that a memory block, on which an erase operation has been completely performed, is included in a free block information.

The controller 200 may transmit a read command required to read fail bits in at least one page to be programmed to the semiconductor memory device 100 before transmitting a program command, and determine whether the number of fail bits, included in at least one page to be programmed, is greater than a first reference value based on the result of the transmission of the read command. As a result of the determination, if the number of fail bits included in at least one page to be programmed is greater than the first reference value, the controller 200 may set the corresponding memory block as a closed block, and re-generate a program address for another memory block to be substitutively programmed. When the number of fail bits included in at least one page to be programmed is equal to or less than the first reference value, the controller 200 may transmit a program command and a program address to the semiconductor memory device 100.

In an embodiment of the present disclosure, the semiconductor memory device 100 may perform a fail bit check operation before performing a program operation without receiving a read command required to read fail bits from the controller 200. More specifically, when a program command is received from the controller 200, the semiconductor memory device 100 may determine whether the number of fail bits included in at least one page to be programmed, is greater than the first reference value. When the number of fail bits is greater than the first reference value, the semiconductor memory device 100 may transmit a fail block detection signal to the controller 200. The controller 200 may set the corresponding memory block as a closed block, re-generate a program address for another memory block to be substitutively programmed, and transmit the re-generated address to the semiconductor memory device 100. When the number of fail bits is equal to or less than the first reference value, the semiconductor memory device 100 may perform a program operation in response to the received program command.

In another embodiment of the present disclosure, the controller 200 may transmit a read command, required to read fail bits in at least one programmed page, to the semiconductor memory device 100 when a program operation is completed, and determine whether the number of fail bits is greater than a second reference value based on the result of the transmission of the read command. As a result of the determination, when the number of fail bits is greater than the second reference value, the controller 200 may perform an operation of moving the data of a memory block including at least one programmed page to another memory block (i.e., a fresh memory block), and set the corresponding memory block as a bad block. In addition, the controller 200 may erase the corresponding memory block, and set the memory block as an erase state. When the number of fail bits is equal to or less than the second reference value, the controller 200 may terminate a fail bit check operation.

In another embodiment of the present disclosure, the semiconductor memory device 100 may perform a fail bit check operation after performing a program operation without receiving a read command required to read fail bits from the controller 200. When the program operation is completed, the semiconductor memory device 100 may determine whether the number of fail bits, included in at least one programmed page, is greater than the second reference value. When the number of fail bits is greater than the second reference value, the semiconductor memory device 100 may provide a fail block detection signal to the controller 200. The controller 200 may perform an operation of moving the data of the memory block including at least one programmed page to another memory block (i.e., a fresh memory block), and set the corresponding memory block as a bad block. In addition, the controller 200 may erase the corresponding memory block, and set the memory block as an erase state. When the number of fail bits is equal to or less than the second reference value, the semiconductor memory device 100 may terminate the program operation.

In various embodiments, the semiconductor memory device 100 or the controller 200 may perform a fail bit check operation on at least one page to be programmed before performing a program operation, and perform a fail bit check operation on at least one programmed page after performing the program operation.

Figure 2:
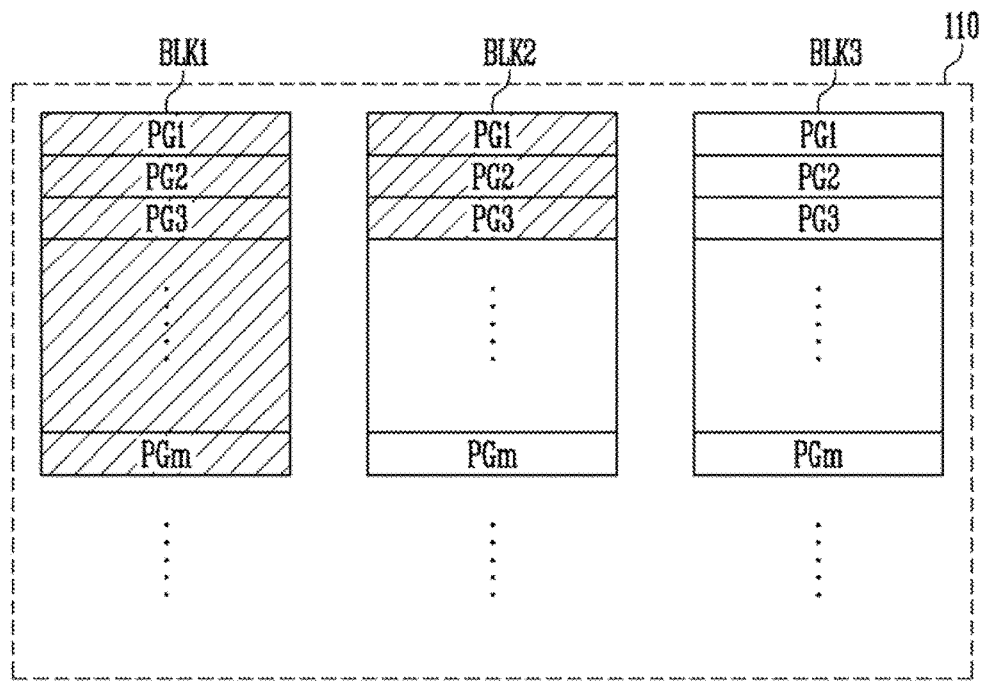
FIG. 2 is a diagram showing the states of memory blocks included in the memory cell array of FIG. 1.

FIG. 2 is a diagram showing the states of memory blocks included in the memory cell array of FIG. 1.

Referring to FIG. 2, the memory cell array 110 may include a plurality of memory blocks. States of the memory blocks may be set depending on the presence of available space for storing data.

A single memory block may include a plurality of pages. A single page may be composed of memory cells (not shown) connected to a single word line. For example, each of first to third memory blocks BLK1 to BLK3 may include first to m-th pages PG1 to PGm. The memory cells included in each page may be implemented as any one of a single level cell (SLC) in which a single data bit is stored, a multi-level cell (MLC) in which two data bits are stored, and a triple level cell (TLC) in which three data bits are stored. In various embodiments, memory cells may each be a quad-level cell (QLC) in which four data bits are stored. In an embodiment, more than four data bits may be stored in each memory cell.

The first memory block BLK1 is a memory block in a completely written state (i.e., a closed block state) (also referred to simply as a "closed blocks"). All pages PG1 to PGm included in the first memory block BLK1 that is in a closed block state, store data. Therefore, data may not be stored in the first memory block BLK1 any more, unless an erase operation is performed first.

The second memory block BLK2 is a memory block in a write-available state (i.e., an open state (also referred to simply as an "open block"). Therefore, an open block may have some pages in which data is stored and the remaining pages in which data is not stored. For example, data is stored in the first to third pages PG1 to PG3 of the second memory block BLK2, and is not stored in the remaining pages, and thus new data may be stored in the remaining pages. The memory cells, included in pages in which data is not stored, may have threshold voltages corresponding to an erase state.

The third memory block BLK3 is a memory block in a non-written state (i.e., a free state) (also referred to simply as a "free block"). Data may be stored in all pages included in the free block. The memory cells included in the free block may have threshold voltages corresponding to the erase state.

The states of the memory blocks included in the memory cell array 100 may be stored as memory block information in the memory block management unit 270 of the controller 200 described above with reference to FIG. 1. The memory block information may be updated as the states of the memory blocks are changed.

Figure 3:
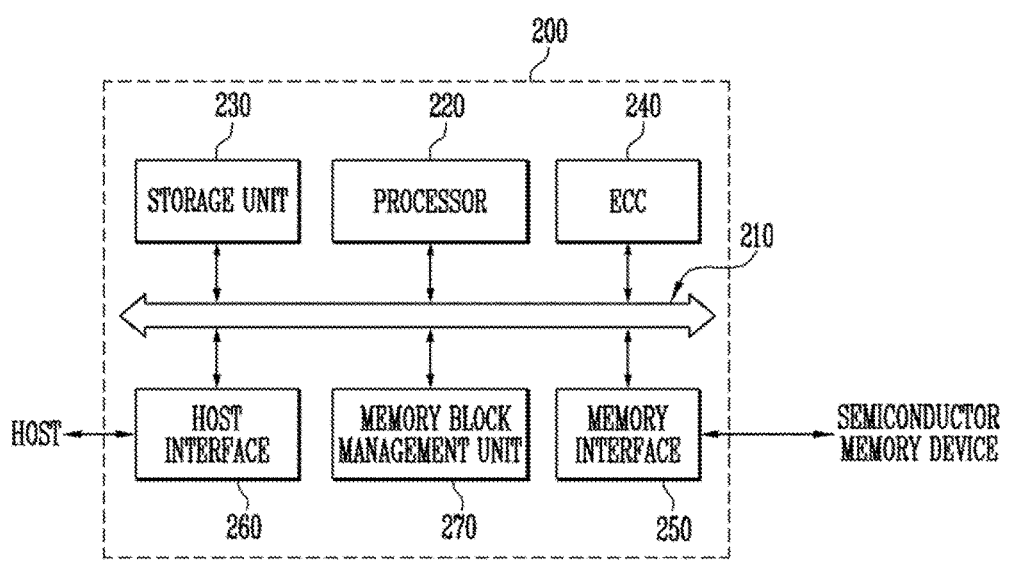
FIG. 3 is a block diagram showing configuration example of the controller of FIG. 1.

FIG. 3 shows a configuration example for the controller 200 of FIG. 1. Referring to FIG. 3, the controller 200 is coupled to a host and to a semiconductor memory device. In response to a request from the host, the controller 200 may access the semiconductor memory device. For example, the controller 200 may control the read operation, the program operation and the erase operation of the semiconductor memory device. The controller 200 may provide an interface between the semiconductor memory device and the host. The controller 200 may run firmware for controlling the semiconductor memory device. The semiconductor memory device 200 may be a flash memory device such as NAND flash or a NOR flash.

The controller 200 may include an internal bus 210, a processor 220, a storage unit 230, an error correction code (ECC) block 240, a memory interface 250, a host interface 260, and a memory block management unit 270.

The internal bus 210 may provide a channel between the components of the controller 200. As an example, the internal bus 210 may be a common channel for transmitting both commands and data. In various embodiments, the internal bus 210 may include a command channel and a data channel for transmitting commands and data, respectively.

The processor 220 may control the overall operation of the controller 200. The processor 220 may execute software and firmware running on the controller 200. The processor 220 may operate firmware, such as a Flash Translation Layer (FTL). The FTL provides various types of means for controlling the semiconductor memory device 100. The FTL may translate a Logical Block Address (LBA) received from the host into a Physical Block Address (PBA) corresponding to a physical memory location in the memory device. The FTL configures information about a mapping relationship between the logical block address, and the physical block address in the form of a table, and then maintains the mapping relationship. In an embodiment, the FTL provides a means for performing control such that the number of programs and the number of erasures of memory blocks in the semiconductor memory device 100 are uniform. For example, the FTL may provide a wear-leveling means. The FTL provides a means for minimizing the number of erasures of the semiconductor memory device 100. For example, the FTL may provide a control means such as a merge, garbage collection, and copy back means.

When a request is received from the host through the host interface 260, the processor 220 may generate a physical block address corresponding to a logical block address of the corresponding request.

The processor 220 may translate a Logical Block Address (LBA) included in the host request into a physical block address.

When the request from the host is a program request, program data (also referred to as write data) may be received from the host. The processor 220 may store the physical block address, program data, and a program command corresponding to the program request in the storage unit 230. The program command, the physical block address, and the program data stored in the storage unit 230 may be transmitted to the semiconductor memory device 100 through the memory interface 250.

When the request from the host is a read request, the processor 220 may store a read command corresponding to the physical block address and the read request in the storage unit 230. The read command and the physical block address may be transmitted to the semiconductor memory device 100 through the memory interface 250. The semiconductor memory device 100 may access memory cells corresponding to the physical block address received from the controller 200, read data stored in the corresponding memory cells, and transmit the read data to the controller 200.

When the request from the host is an erase request, the processor 220 may store an erase command corresponding to the physical block address and the erase request in the storage unit 230. The erase command and physical block address, stored in the storage unit 230, may be transmitted to the semiconductor memory device 100 through the memory interface 250. The semiconductor memory device 100 erase data in the memory block corresponding to the physical block address received from the controller 200.

The storage unit 230 may be used as a working memory for the processor 220. Alternatively, the storage unit may be used as a buffer memory between the semiconductor memory device 100 and the host. In an embodiment, the storage unit 230 may be used as cache memory between the semiconductor memory device 100 and the host. Further, the storage unit 230 may be used as a buffer for temporarily storing the data inputted from the semiconductor memory device 100. As an example, the storage unit may include at least one of various memories enabling random access, such as an SRAM (Static RAM), a DRAM (Dynamic RAM), SDRAM (Synchronous DRAM), a PRAM (Phase-change RAM), MRAM (Magnetic RAM), an RRAM (Resistive RAM), an FRAM (Ferroelectric RAM), and a NOR flash memory.

The Error Correction Code (ECC) block 240 may detect and correct error in the data read from the semiconductor memory device 100.

The memory interface 250 includes a protocol required to communicate with the semiconductor memory device 100. For example, the memory interface 250 may include at least one of flash interfaces such as a NAND interface and a NOR interface.

The host interface 260 includes a protocol required to perform data exchange between the host and the controller 200. In an exemplary embodiment, the controller 200 may communicate with the external system (host) through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol, and a private protocol.

The memory block management unit 270 manages memory blocks in the memory cell array included in the semiconductor memory device 100. The memory block management unit 270 may include memory block information indicating the state of each memory block. In an embodiment, the memory block information may include at least one of bad block information that is information about bad memory blocks, open block information that is information about memory blocks having residual data storage space, free block information that is information about memory blocks in which data is not stored, and closed block information that is information about memory blocks having no residual available data storage space.

The processor 220 may generate a physical block address based on the memory block information stored in the memory block management unit 270. For example, the processor 220 may generate the addresses of memory cells included in an open block or a free block, which is other than any closed blocks and bad blocks, as a physical block address at which data is to be stored.

The processor 220 may update memory block information included in the memory block management unit 270 based on the result of the fail bit check operation. For example, the processor 220 may control the memory block management unit 270 to set a memory block, completely programmed to have no residual storage space for storing data, as a closed block state. Further, in order to set memory block including the number of fail bits that is greater than a first reference value as a closed block state, the processor 220 may control the memory block management unit 270. Further, the processor 220 may control the memory block management unit 270 to set a memory block including the number of fail bits that is greater than a second reference value as a bad block state. Further, the controller 200 may control the memory block management unit 270 to set a memory block, in which the erase operation has been completed, as a free block state.

In an embodiment of the present disclosure, the processor 220 may transmit a read command, required to read fail bits in at least one page to be programmed, to the semiconductor memory device 100 before transmitting a program command, and may determine whether the number of fail bits included in the at least one page to be programmed is greater than the first reference value, based on the result of the transmission of the read command. As a result of the determination, when the number of fail bits included in at least one page to be programmed is greater than the first reference value, the processor 220 may set a memory block in which the at least one page to be programmed is included as a closed block state, and may re-generate a program address for programming the data in another memory block to be substitutively programmed instead of the initially selected memory block. When the number of fail bits included in at least one page to be programmed is equal to or less than the first reference value, the processor 220 may transmit the received program command and the initially generated program address to the semiconductor memory device.

In an embodiment, the semiconductor memory device may perform a fail bit check operation before performing a program operation without receiving a read command for reading fail bits from the controller 200. More specifically, when the program command is received from the controller 200, the semiconductor memory device may check whether the number of fail bits, included in at least one page to be programmed, is greater than the first reference value without receiving a read command from the controller 200. When the number of fail bits included in the at least one page to be programmed is greater than the first reference value, the semiconductor memory device may provide a fail block detection signal to the controller 200 and the processor 220 may set the memory block which includes the at least one page to be programmed as a closed block. The controller may also re-generate a program address for selecting another memory block which is to be substitutively programmed (i.e., instead of the now closed block), and transmit the re-generated program address to the semiconductor memory device. When the number of fail bits for the selected page to be programmed is equal to or less than the first reference value, the semiconductor memory device 100 may perform the program operation for the initially selected page and memory block in response to the received program command.

In another embodiment of the present disclosure, when the program operation is completed, the processor 220 may transmit a read command required to read the fail bits in at least one programmed page to the semiconductor memory device 100, and determine whether the number of fail bits is greater than a second reference value, based on the result of the transmission of the read command. As a result of the determination, if the number of fail bits included in the at least one programmed page is greater than the second reference value, the processor 220 may perform an operation of moving data stored in a memory block including the at least one programmed page to another memory block (i.e., a fresh memory block), and set the corresponding memory block as a bad block. The processor 220 may terminate a fail bit check operation when the number of fail bits included in the at least one programmed page is equal to or less than the second reference value.

In a further embodiment of the present disclosure, the semiconductor memory device may perform a fail bit check operation after a program operation without receiving a read command required to read fail bits from the controller 200. When the program operation is completed, the semiconductor memory device may determine whether the number of fail bits, included in the at least one programmed page, is greater than the second reference value. When the number of fail bits included in the at least one programmed page is greater than the second reference value, the semiconductor memory device may provide a fail block detection signal to the controller 200. The processor 220 may perform an operation of moving the data of a memory block including the at least one programmed page to another memory block (i.e., a fresh memory block), and set the corresponding memory block as a bad block. In an embodiment, the controller 200 may erase the bad memory block, and set the memory block as an erase state. When the number of fail bits included in the at least one programmed page is equal to or less than the second reference value, the semiconductor memory device may terminate the program operation.

In various embodiments, the processor 220 may perform a fail bit check operation by transmitting a read command required to read the fail bits in at least one page to be programmed before transmitting the program command to the semiconductor memory device, and perform a fail bit check operation by transmitting a read command required to read fail bits in at least one programmed page after performing the program operation to the semiconductor memory device.

Figure 4:
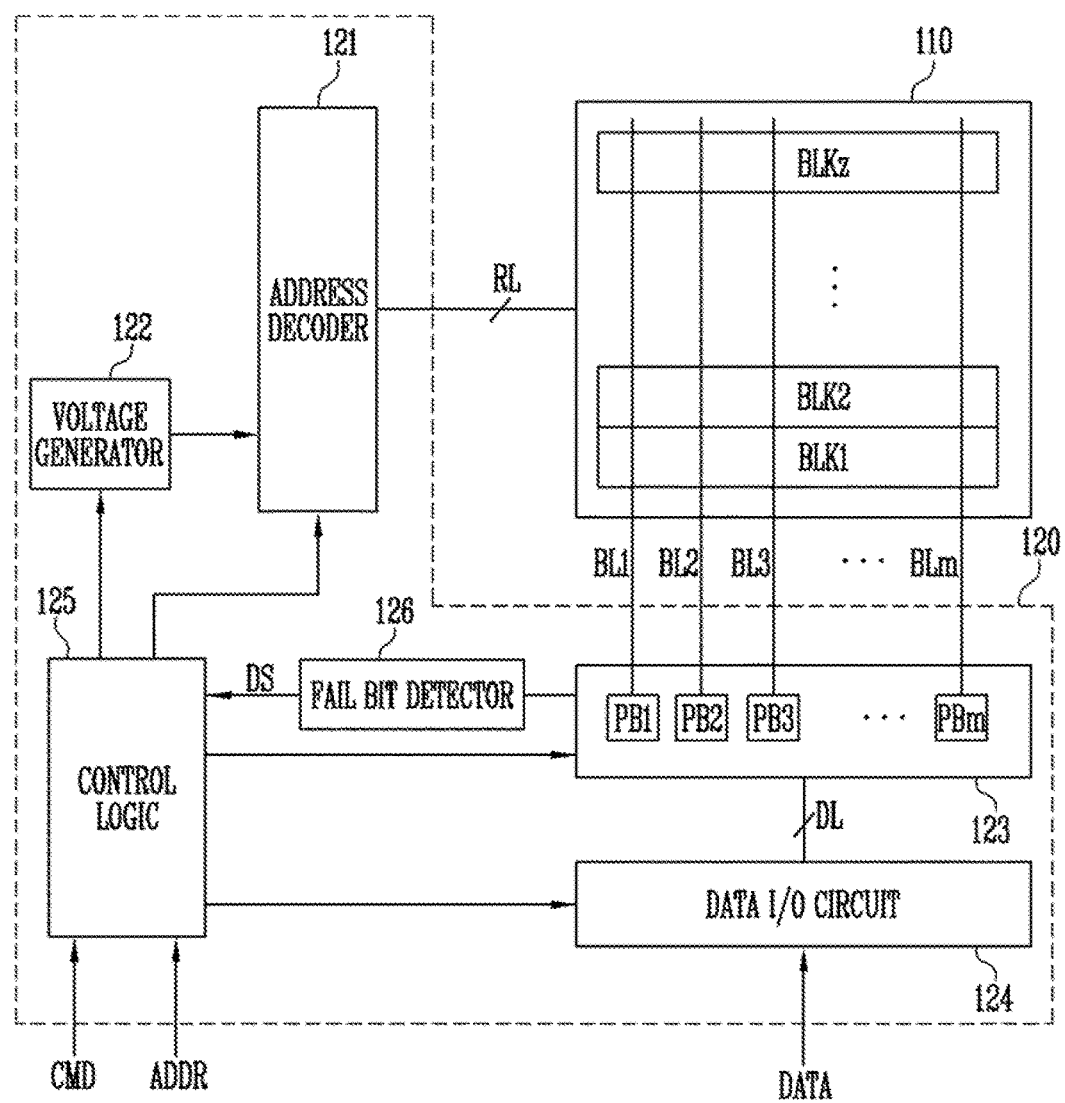
FIG. 4 is a block diagram showing a configuration example of the semiconductor memory device of FIG. 1.

FIG. 4 is a block diagram showing a configuration example structure for the semiconductor memory device of FIG. 1.

Figure 5:
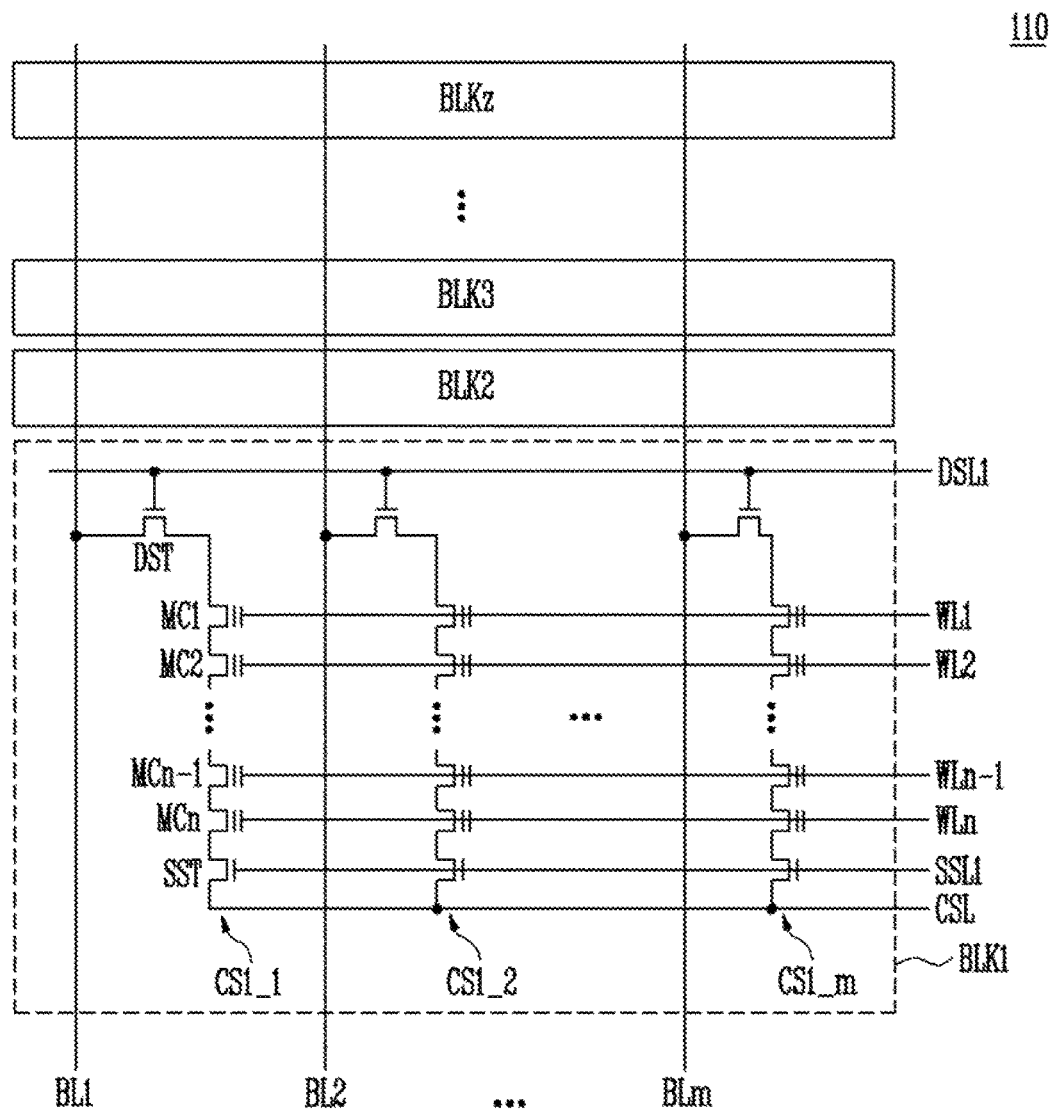
FIG. 5 is a diagram showing an embodiment of the memory cell array of FIG. 4.

FIG. 5 is a block diagram showing an example of the memory cell array of FIG. 4.

Referring to FIG. 4, the semiconductor memory device 100 includes a memory cell array 110 and a peripheral circuit 120.

The memory cell array 110 includes a plurality of memory blocks BLK1 to BLKz. The plurality of memory blocks BLK1 to BLKz are coupled to an address decoder 121 through row lines (i.e., word lines, drain select and source select lines) RLs, and are coupled to a read and write circuit 123 through bit lines BL1 to BLm. Each of the plurality of memory blocks BLK1 to BLKz includes a plurality of memory cells. In an embodiment the memory cells may be nonvolatile memory cells.

Referring to FIG. 5, the first to z-th memory blocks BLK1 to BLKz are coupled in common to first to m-th bit lines BL1 to BLm. In FIG. 5, for the convenience of description, elements included in the first memory block BLK1 among the plurality of memory blocks BLK1 to BLKz are illustrated, and elements included in the remaining memory blocks BLK2 to BLKz, respectively, are omitted. It should be understood that the remaining memory blocks BLK2 to BLKz are configured in the same manner as the first memory block BLK1.

The memory block BLK1 includes a plurality of cell strings CS1_1 to CS1_m. The first to m-th cell strings CS1_1 to ~CS1_m are coupled to first to m-th bit lines BL1 to BLm, respectively.

Each of the first to m-th cell strings CS1_1 to CS1_m includes a drain select transistor DST, a plurality of memory cells MC1 to MCn, and a source select transistor SST, connected in series in the recited order between a common source line CSL and a respective bit line. The gate of the drain select transistor DST is coupled to a common drain select line DSL1. The gates of the first to n-th memory cells MC1 to MCn are coupled to first to n-th word lines WL1 to WLn. The gate of the source select transistor SST is coupled to a common source select line SSL1. The drain of the drain select transistor DST is coupled to the corresponding bit line. The drain of each of the select transistors of the first to m-th cell strings CS1_1 to CS1_m is coupled to the first to m-th bit lines BL1 to BLm. The source of each of the source select transistor SST is coupled to a common source line CSL. In an example, the common source line CSL may be coupled in common to the first to z-th memory blocks BLK1 to BLKz.

The drain select line DSL1, the first to n-th word lines WL1 to WLn, and the source select line SSL1 are included in the row lines RLs (i.e., word lines) of FIG. 4. The drain select line DSL1, the first to n-th word lines WL1 to WLn, and the source select line SSL are controlled by the address decoder 121. The common source line CSL is controlled by the control logic 125. The first to m-th bit lines BL1 to BLm are controlled by the read and write circuit 123.

Referring back to FIG. 4, the peripheral circuit 120 includes the address decoder 121, the voltage generator 122, the read and write circuit 123, the data input/output (I/O) circuit 124, the control logic 125, and the fail bit detector 126.

The address decoder 121 is coupled to the memory cell array 110 through the row lines (i.e., word lines) RLs. The address decoder 121 may be operated under the control of the control logic 125. The address decoder 121 receives an address ADDR through the control logic 125.

In an embodiment, the program operation and the read operation of the semiconductor memory device 100 are performed on a page basis.

The address decoder 120 may decode a block address in the received address ADDR. The address decoder 120 selects one memory block from among memory blocks BLK1 to BLKz based on the decoded block address.

The address decoder 120 may also decode a row address in the received address ADDR. The address decoder 120 selects a single word line in the memory block selected in response to the decoded row address. Accordingly, a single page is selected.

In an embodiment, the address decoder 120 may include an address buffer, a block decoder, and a row decoder.

The voltage generator 122 may generate a plurality of voltages using an external supply voltage supplied to the semiconductor memory device 100. The voltage generator 122 is operated under the control of the control logic 125.

In an embodiment, the voltage generator 122 may generate an internal supply voltage by regulating the external power voltage. The internal power voltage generated by the voltage generator 122 is used as an operating voltage for the semiconductor memory device 100.

In an embodiment, the voltage generator 122 may generate a plurality of voltages using an external supply voltage or an internal supply voltage. For example, the voltage generator 122 may include a plurality of pumping capacitors for receiving the internal supply voltage, and may generate a plurality of voltages by selectively activating the plurality of pumping capacitors under the control of the control logic 125. The generated voltages are applied to the word lines selected by the address decoder 121.

In a program operation, the voltage generator 122 may generate a high-voltage program pulse and a pass pulse that is lower than the program pulse. In a read operation, the voltage generator 130 may generate a read voltage and a pass voltage that is higher than the read voltage. In an erase operation, the voltage generator 130 may generate an erase voltage.

The read and write circuit 123 includes first to m-th page buffers PB1 to PBm. The first to m-th page buffers PB1 to PBm are coupled to the memory cell array 110 through the first to m-th bit lines BL1 to BLm. The first to m-th page buffers PB1 to PBm are operated under the control of the control logic 125.

The first to m-th page buffers PB1 to PBm transmits/receives data to/from the data I/O circuit 124. In a program operation, the first to m-th page buffers PB1 to PBm may receive data DATA to be stored through the data I/O circuit 124 and the data lines DLs.

In a program operation, when a program pulse is applied to the selected word line, the first to m-th page buffers PB1 to PBm may transfer the data DATA to be stored, that is, the data DATA received through the data I/O circuit 124 to the memory cells selected through the bit lines BL1 to BLm. The memory cells of the selected page are programmed depending on the data DATA. A memory cell coupled to a bit line to which a program permission voltage (e.g. ground voltage) is applied may have an increased threshold voltage. The threshold voltage of the memory cell coupled to a bit line to which a program prohibition voltage (e.g., a supply voltage) is applied may be maintained. In a program verification operation, the first to m-th page buffers PB1 to PBm may read page data from the selected memory cells through the bit lines BL1 to BLm.

When the program operation is performed, the memory cells may have threshold voltages corresponding to any one of an erase state and first to n-th program states PV1 to PVn which are identified based on the threshold voltage.

When a memory cell is a single level cell (SLC) in which a single data bit is stored, it may have a state corresponding to any one of an erase state and a first program state PV1 as the program operation is performed. When a memory cell is a multi-level cell (MLC) in which two data bits are stored, it may have a state corresponding to any one of an erase state and the first to third program states PV1 to PV3 as the program operation is performed. When a memory cell is a triple level cell (TLC) in which three data bits are stored, it may have a state corresponding to any one of an erase state and first to seventh program states PV1 to PV7 as the program operation is performed. In an embodiment, the memory cell may have a four or more data bits, and thus the number of program states which the memory cell may have may increase.

In a read operation, a read voltage Vread may be applied to a word line selected by the address decoder 121. The read voltage applied to the selected word line may have voltage levels required to classify a plurality of program states that are determined depending on the number of data bits stored in the memory cell. For example, when a memory cell is a single level cell (SLC) in which a single data bit is stored, a first read voltage required to identify an erase state and a first program state PV1 may be applied. When a memory cell is a multi-level cell (MLC) in which two data bits are stored, first to third read voltages R1 to R3 required to identify an erase state and first to third program states PV1 to PV3 may be sequentially applied. When a memory cell is a triple level cell (TLC) in which three data bits are stored, first to seventh read voltages R1 to R7 required to identify an erase state and first to seventh program states PV1 to PV7 may be sequentially applied. When the read voltages are applied to the selected word lines, the read and write circuit 123 reads data DATA from memory cells in the selected page through bit lines BLs, and outputs the read data DATA to the data I/O circuit 124.

In an erase operation, the read and write circuit 123 may float the bit lines BLs.

In an embodiment, the read and write circuit 123 may include a column select circuit.

The data I/O circuit 124 is coupled to the first to m-th page buffers PB1 to PBm through data lines DLs. The data I/O circuit 124 is operated under the control of the control logic

125. In a program operation, the data I/O circuit 124 receives data DATA to be stored from an external controller (not shown). In a read operation, the data I/O circuit 124 receives the read data DATA from the read and write circuit 123 and outputs the read data DATA to the external controller.

The control logic 125 is coupled to the address decoder 121, the voltage generator 122, the read and write circuit 123, the data I/O circuit 124, and the fail bit detector 126. The control logic 125 may control the overall operation of the semiconductor memory device 100. The control logic 125 receives a command CMD and an address ADDR from the external controller. The control logic 125 may control the address decoder 121, the voltage generator 122, the read and write circuit 123, the data I/O circuit 124, and the fail bit detector 126 in response to the command CMD. The control logic 125 transfers the address ADDR to the address decoder 121.

The fail bit detector 126 is coupled to the first to m-th page buffers PB1 to PBm and to the control logic 125. The fail bit detector 126 is operated under the control of the control logic 125.

In accordance with an embodiment of the present disclosure, any one of a first fail check voltage and a second fail check voltage may be applied to a selected word line during a fail bit check operation. The page data read from the selected memory cells is temporarily stored in the first to m-th page buffers PB1 to PBm. The first to m-th page buffers PB1 to PBm may detect fail bits included in the selected memory cells under the control of the control logic 125. The first fail check voltage may have a voltage level required to verify a threshold voltage corresponding to an erase state. The second fail check voltage may be a voltage required to read a logical page that is programmed last when a single memory cell is implemented as a triple level cell (TLC) in which three data bits are stored. In an embodiment, the second fail check voltage may be a read voltage required to read a Most Significant Bit (MSB). In an embodiment, the second fail check voltage may be the first read voltage.

The first to m-th page buffers PB1 to PBm may generate fail bits indicating whether data bits in the page data are data bits in the erase state. Therefore, the fail bits may indicate whether the threshold voltage of the selected memory cells is in an erase state. The generated fail bits are transferred to the fail bit detector 126.

When the number of fail bits is greater than a designated number (a first reference value or a second reference value), the fail bit detector 126 enables a detection signal DS. When the number of fail bits is less than or equal to a reference value, the fail bit detector 126 disables the detection signal DS. When it is determined whether to enable the detection signal DS, the first reference value is used when fail bits in at least one page to be programmed are checked, and the second reference value may be used when fail bits in at least one programmed page are checked. In an embodiment, the second reference value may have a value greater than the first reference value.

The control logic 125 controls the peripheral circuit 120 to perform a program operation when the detection signal DS is disabled. When the detection signal DS is enabled, the control logic 125 may output a fail block detection signal SF indicating that a memory block including the selected page is a fail block.

Figure 6:
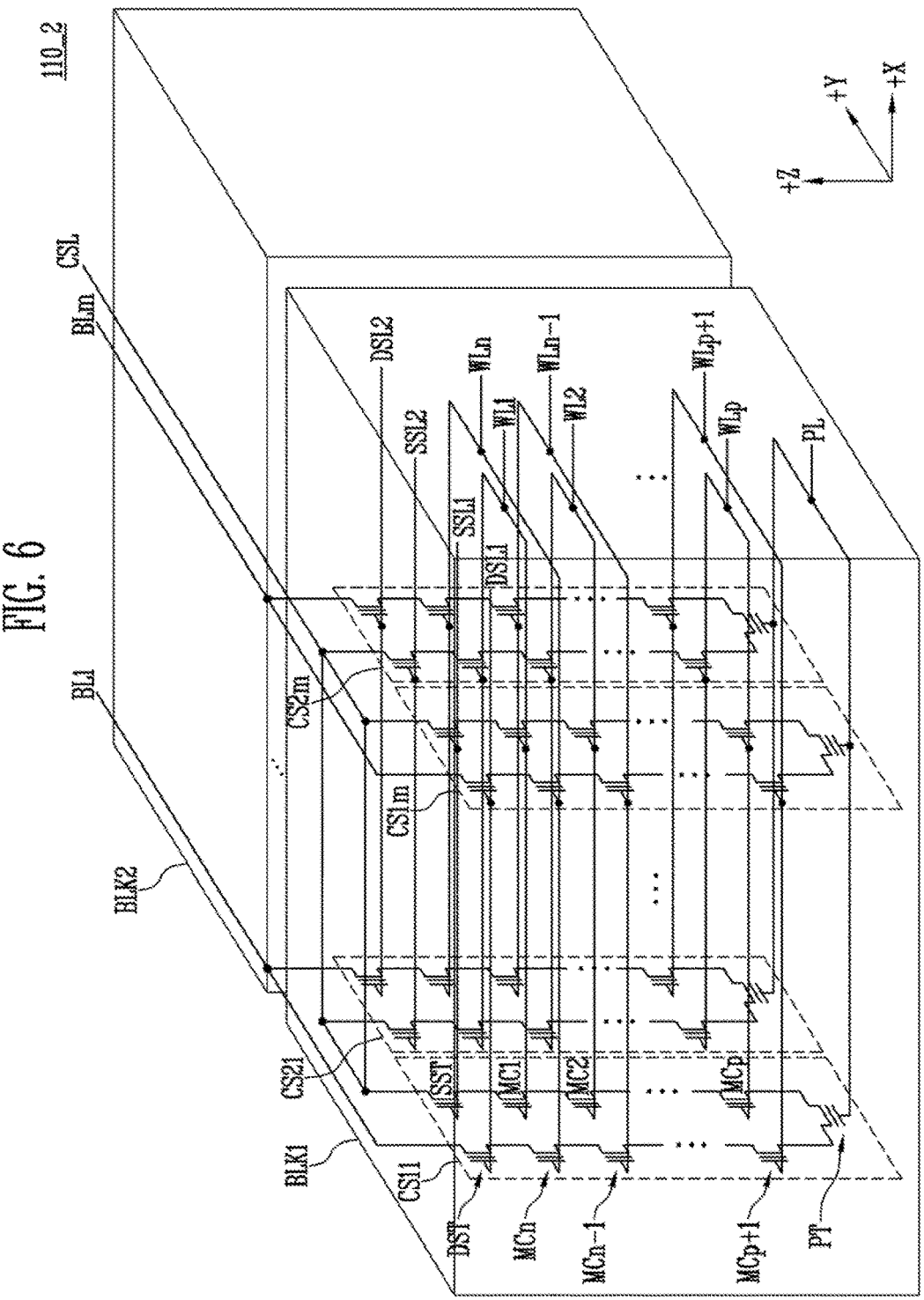
FIG. 6 is a diagram showing another embodiment of the memory cell array of FIG. 4.

FIG. 6 illustrates another embodiment of the memory cell array of FIG. 4.

Referring to FIG. 6, a memory cell array 110_2 includes a plurality of memory blocks BLK1 to BLKz. In FIG. 5, for the convenience of description, the internal configuration of the first memory block BLK1 is illustrated, and the internal configuration of the remaining memory blocks BLK2 to BLKz is omitted. It should be understood that the second to z-th memory blocks BLK2 to BLKz are configured in the same manner as the first memory block BLK1.

Referring to FIG. 6, the first memory block BLK1 includes a plurality of cell strings CS11 to CS1*m* and CS21 to CS2*m*. Each of the cell strings CS11 to CS1*m* and CS21 to CS2*m* may be formed in a 'U' shape. In the first memory block BLK1, m cell strings are arranged in a row direction (i.e. +X direction) and two cell strings are arranged in a column direction (i.e. +y direction). However, this illustration is made for convenience of description, and it should be understood that three or more cell strings may be arranged in the column direction.

Each of the plurality of cell strings CS11 to CS1*m* and CS21 to CS2*m* includes at least one source select transistor SST, first to n-th memory cells MC1 to MCn, a pipe transistor PT, and at least one drain select transistor DST.

The select transistors SST and DST and the memory cells MC1 to MCn may have similar structures. In an embodiment, each of the select transistors SST and DST and the memory cells MC1 to MCn may include a channel layer, a tunneling insulating layer, a charge storage layer, and a blocking insulating layer as it is well known in the art. In an embodiment, a pillar for providing the channel layer may be provided to each cell string. In an embodiment, a pillar for providing at least one of the channel layer, the tunneling insulating layer, the charge storage layer, and the blocking insulating layer may be provided to each cell string.

The source select transistor SST of each cell string is connected between the common source line CSL and the first memory cell MC1 of the plurality of memory cells MC1 to MCp.

In the embodiment of FIG. 6, the gates of the source select transistors of the cell strings arranged in the same row are connected to a common source select line extended in a row direction, and source select transistors of cell strings arranged in different rows are connected to different source select lines. More specifically, the gates of the source select transistors of the cell strings CS11 to CS1*m* which are in a first row are connected to a first source select line SSL1. The gates of the source select transistors of the cell strings CS21 to CS2*m* which are in a second row are connected to a second source select line SSL2.

In another embodiment (not shown), the gates of the source select transistors of the cell strings CS11 to CS1*m* and CS21 to CS2*m* of the same block BLK1 may be coupled in common to a single source select line.

In each memory cell string, the first to n-th memory cells MC1 to MCn in each cell string are connected in series between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are sequentially arranged in a direction opposite the +Z direction, and are connected in series between the source select transistor SST and the pipe transistor PT. The p+1-th to n-th memory cells MCp+1 to MCn are sequentially arranged in the +Z direction, and are connected in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

In an embodiment, at least one of the first to n-th memory cells MC1 to MCn may be used as a dummy memory cell. When the dummy memory cell is provided, the voltage or current of the corresponding cell string may be stably controlled. Accordingly, the reliability of data stored in the memory block BLK1 is improved.

The gate of the pipe transistor PT of each cell string of the block BLK1 is coupled to a common pipeline PL.

The drain select transistor DST of each cell string is connected between the corresponding bit line and the last memory cell MCn of the memory cells MCp+1 to MCn. The gates of the drain select transistors DST in the same row are coupled to a common drain select line extended in the row direction. The gates of the drain select transistors DST of cell strings CS11 to CS1m in the first row are coupled to a first drain select line DSL1. The gates of the drain select transistors of cell strings CS21 to CS2m in a second row are coupled to a second drain select line DSL2.

The drain select transistors of cell strings arranged in the same column in the column direction are coupled to a common bit line extended in the column direction. Specifically, as illustrated in FIG. 4, the drain select transistors DST of the cell strings CS11 and CS21 in a first column are coupled to a first bit line BL1. The drain select transistors DST of the cell strings CS1m and CS2m in an m-th column are coupled to an m-th bit line BLm.

The memory cells coupled to the same word line in cell strings arranged in a row direction constitute a single page. For example, memory cells having their gates coupled to the first word line WL1 among cell strings CS11 to CS1m in the first row constitute a single page. Memory cells having their gates coupled to the first word line WL1 among the cell strings CS21 to CS2m in the second row constitute a single additional page. Cell strings arranged in the direction of a single row may be selected by selecting any one of the drain select lines DSL1 and DSL2. A single page may be selected from the selected cell strings by selecting any one of the word lines WL1 to WLn.

Figure 7:
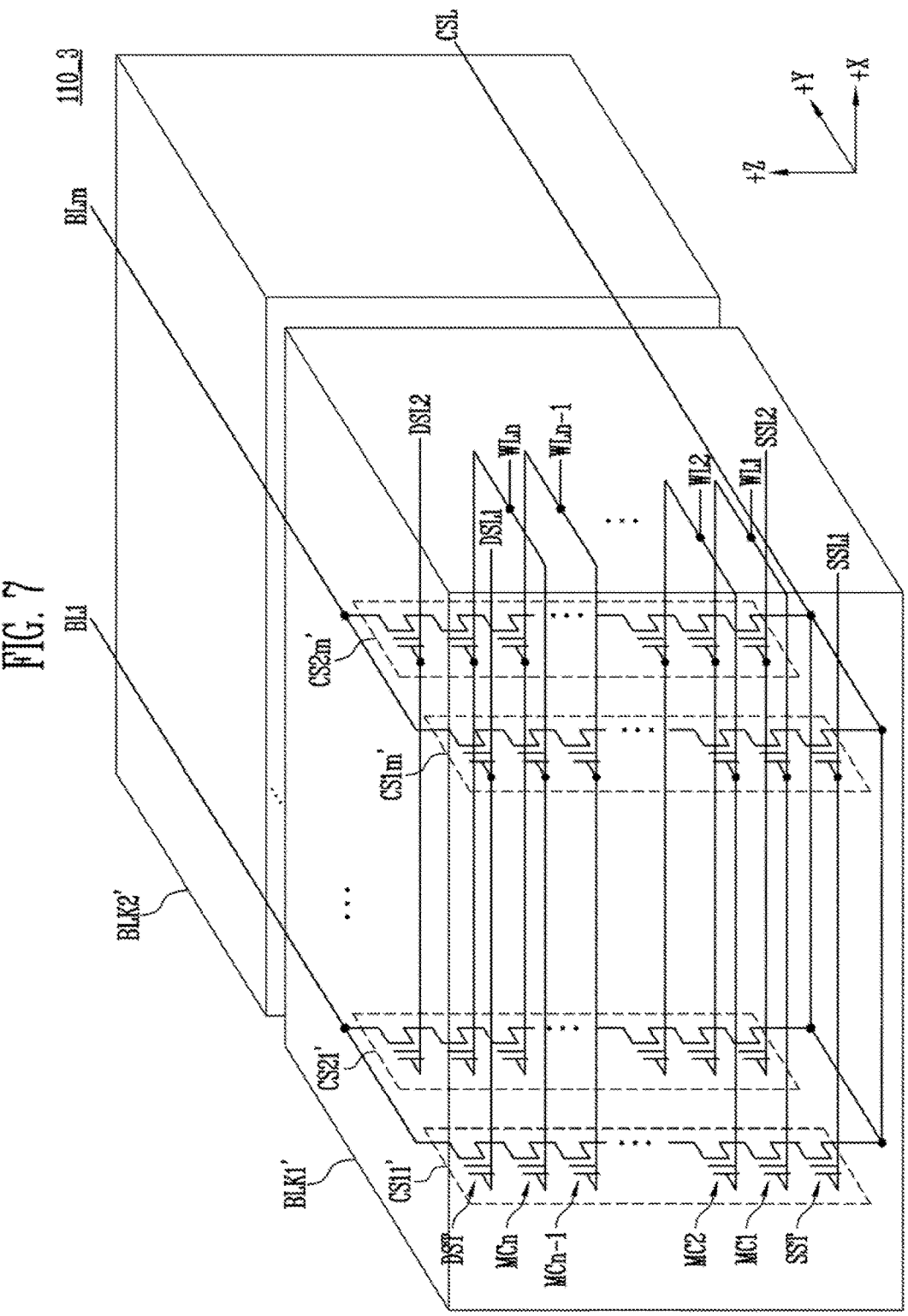
FIG. 7 is a diagram showing a further embodiment of the memory cell array of FIG. 4.

FIG. 7 illustrates a further embodiment of the memory cell array of FIG. 4.

Referring to FIG. 7, a memory cell array 110_3 includes a plurality of memory blocks BLK1' to BLKz'. In FIG. 7, for the convenience of description, the internal configuration of the first memory block BLK1' is illustrated, and the illustration of the internal configuration of the remaining memory blocks BLK2' to BLKz' is omitted. It should be understood that the second to z-th memory blocks BLK2' to BLKz' are configured in the same manner as the first memory block BLK1'.

The first memory block BLK1' includes a plurality of cell strings CS11' to CS1m' and CS21' to CS2m'. Each of the plurality of cell strings CS11' to CS1m' and CS21' to CS2m' extends along a +Z direction. In the first memory block BLK1', m cell strings are arranged in a +X direction. In FIG. 7, two cell strings are shown as being arranged in a +Y direction. However, this configuration is made for the convenience of description, and it should be understood that three or more cell strings may be arranged in the column direction.

Each of the cell strings CS11' to CS1m' and CS21' to CS2m' includes at least one source select transistor SST, first to n-th memory cells MC1 to MCn, and at least one drain select transistor DST coupled in series between a common source line CSL and a respective bit line, with two cell stings which are arranged in the same column being coupled to the same bit line. Hence, cell strings CS11' and CS21' which are arranged in the first column are coupled to the same bit line BL1.

The source select transistor SST of each cell string is connected between a common source line CSL and memory cell MC1 of the memory cells MC1 to MCn. The gate of each of the source select transistors of the cell strings arranged in the same row is connected to the same source select line. Hence, the gate of each of the source select transistors of the cell strings CS11' to CS1m' arranged in the first row is coupled to a first source select line SSL1. The gate of each of the source select transistors of the cell strings CS21' to CS2m' arranged in a second row is coupled to a second source select line SSL2. In another embodiment (not shown), the gate of each of the source select transistors of the cell strings CS11' to CS1m' and CS21' to CS2m' of block BLK1 may be coupled in common to a single source select line.

The first to n-th memory cells MC1 to MCn in each cell string are connected in series between the source select transistor SST and the drain select transistor DST. The gates of the first to n-th memory cells MC1 to MCn are connected to first to n-th word lines WL1 to WLn, respectively.

In an embodiment, at least one of the first to n-th memory cells MC1 to MCn may be used as a dummy memory cell. When the dummy memory cell is provided, the voltage or current of the corresponding cell string may be stably controlled. Accordingly, the reliability of data stored in the memory block BLK1' is improved.

The drain select transistor DST of each cell string is connected between the corresponding bit line and the memory cell MCn of the memory cells MC1 to MCn. The gate of each of the drain select transistors of the cell strings arranged in the same row in the row direction is coupled to a common drain select line extended in the row direction. As illustrated n FIG. 7, the gate of each of the drain select transistors of the cell strings CS11' to CS1m' in the first row is connected to a first drain select line DSL1. The gate of each of the drain select transistor of the cell strings CS21' to CS2m' in the second row is coupled to a second drain select line DSL2.

As a result, the memory block BLK1' of FIG. 7 has the same equivalent circuit as the memory block BLK1 of FIG. 6 except that a pipe transistor PT is excluded from each cell string in FIG. 7.

Figure 8:
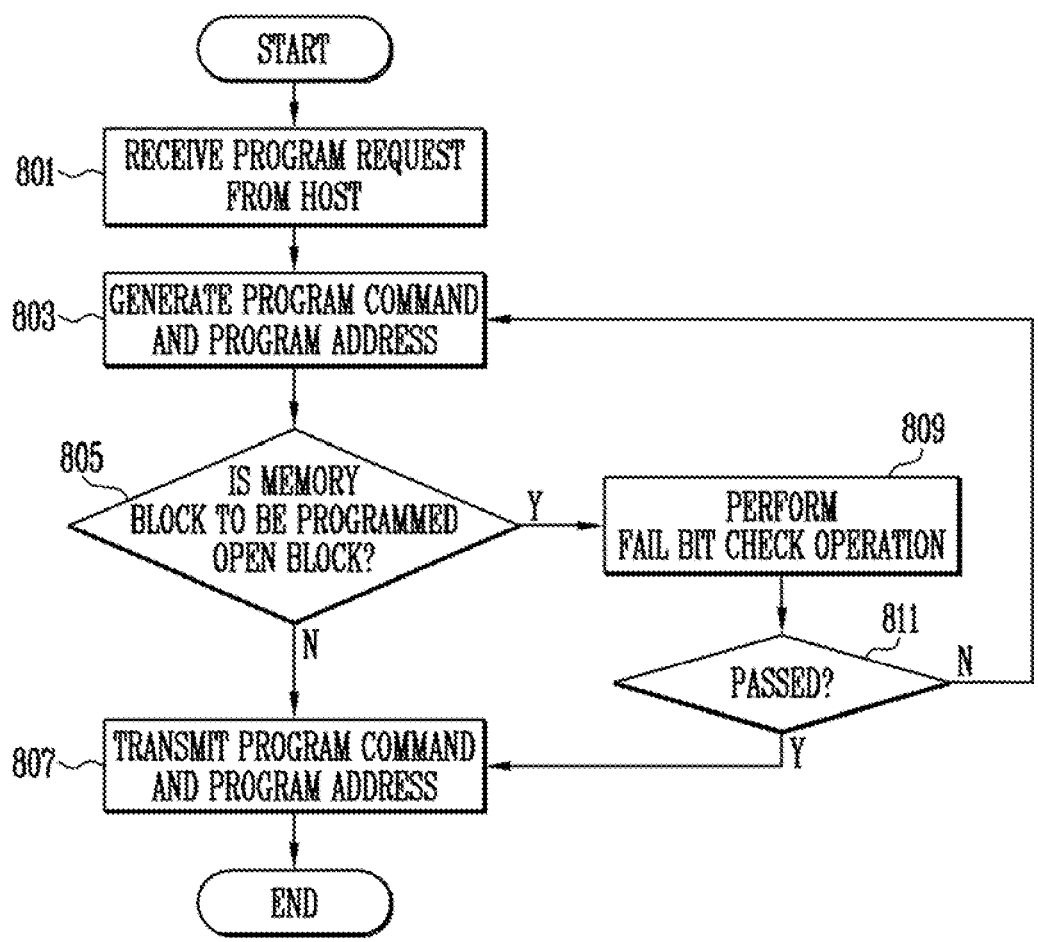
FIG. 8 is a flowchart showing an operation of a controller, according to an embodiment of the present disclosure.

FIG. 8 is a flowchart showing an operation of a controller according to an embodiment of the present disclosure. For example, the controller may correspond to the controller 200 shown in FIG. 1.

Referring to FIG. 8, at step 801, the controller receives a program request from a host. The controller may receive data to be stored in a semiconductor memory device and a logical block address from the host. For example, the semiconductor memory device may correspond to the semiconductor memory device 100 shown in FIG. 1.

At step 803, the controller may generate a program command and a program address that is a physical block address required to store data. The controller may generate the physical block address based on the states of the plurality of memory blocks included in the semiconductor memory device. For example, the controller may generate a program address for storing data in at least one page included in any one of a free block and an open block of the memory device.

At step 805, the controller may determine whether the program address belongs to an open block. The controller may determine whether the program address belongs to the open block, based on memory block information included in a memory block management unit. For example, the memory block management unit may correspond to the memory block management unit 270 shown in FIG. 1. The memory block information may include at least one of a bad block information, an open block information indicating information about memory blocks having residual data storage space, a free block information indicating information about memory blocks in which no data is stored, and a closed block information indicating information about memory blocks having no residual data storage space. As a result of the determination, if the program address does not belong to an open block, the process proceeds to step 807, whereas if the program address belongs to an open block, the process proceeds to step 809.

At step 805, if the program address does not belong to an open block, this means that the program address belongs to a free block. Hence, at step 807, the controller may transmit both the program command and the program address, which are generated at step 803, to the semiconductor memory device and the controller performs the program operation without performing a fail bit check operation on the free block.

If the program address belongs to an open block, a fail bit check operation may be performed at step 809. A detailed method of performing the fail bit check operation will be described in detail with reference to FIG. 9.

At step 811, it is determined whether or not the fail bit check operation is passed. When the fail bit check operation is determined to be passed, a program operation may be performed on the corresponding open block (i.e., the process proceeds to step 807). When the fail bit check operation is determined to be failed, a program operation may not be performed on the corresponding open block, and the process returns to step 803 to generate a new program address (i.e., a substitutive program address). In an embodiment, an open block, determined to have failed in the fail bit check operation, may be set as a closed block. Such an information setting operation may be performed by updating a state of the corresponding memory block. Here, a program operation for storing dummy data in empty pages included in the failed block may be performed, and thereafter the failed block may be set as a closed block.

Figure 9:
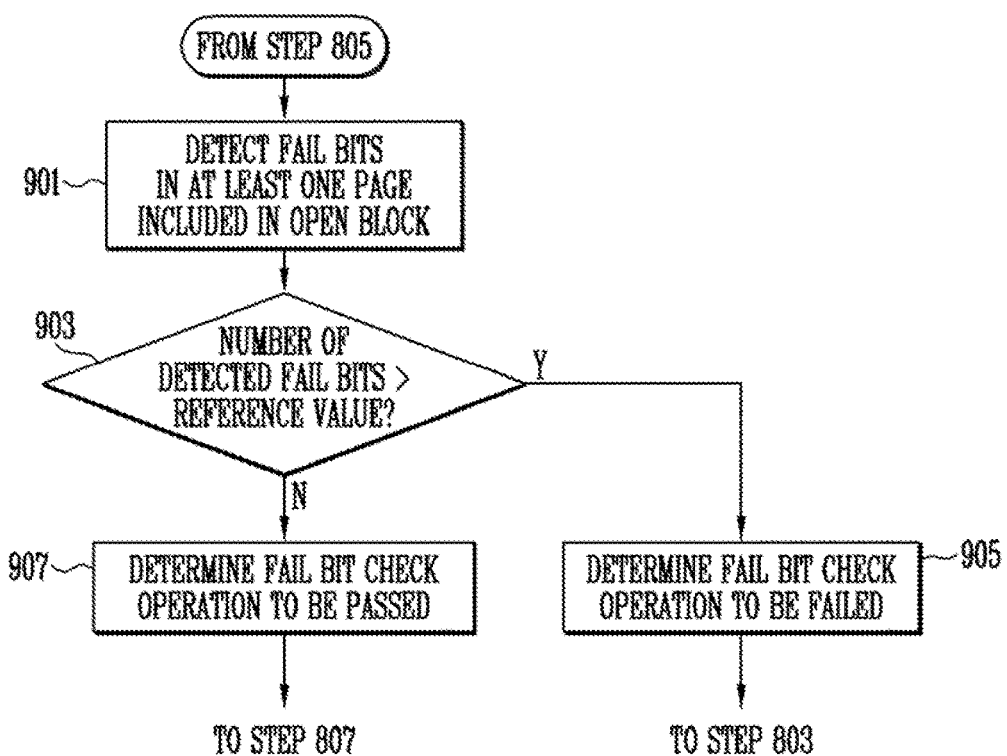
FIG. 9 is a detailed flowchart for describing a fail bit check operation of FIG. 8.

FIG. 9 is a detailed flowchart for describing the fail bit check operation of FIG. 8.

Referring to FIG. 9, at step 901, the controller may detect fail bits in at least one page included in the open block. The controller may generate a read command for reading at least one page included in the open block to detect fail bits included therein, and transmit the generated read command to the semiconductor memory device.

The at least one page to be read may correspond to the program address generated at step 803 of FIG. 8. In an embodiment, an operation of detecting fail bits may be performed on all or some of the empty pages included in the open block, in which data is not stored. When fail bits are detected in some pages, some pages may be at least one of pages corresponding to a word line adjacent to any one of a drain select line and a source select line.

In accordance with an embodiment, a first fail check voltage may be applied to a selected word line during an operation for reading the at least one page included in the open block. Here, the first fail check voltage may have a voltage level required to verify a threshold voltage corresponding to an erase state. The controller may receive the result of the read operation on at least one page to be programmed using the first fail check voltage from the semiconductor memory device.

At step 903, the controller may determine whether the number of detected fail bits is greater than a reference value. Here, the reference value may be a first reference value. The first reference value indicates the number of fail bits per kilobyte (kB). For example, the first reference value may indicate five fail bits per kB.

As a result of the determination at step 903, if the number of detected fail bits is greater than the first reference value, the controller may proceed to step 905 where it may be determined that the fail bit check operation has failed. In contrast, if the number of detected fail bits is equal to or less than the first reference value, the controller may proceed to step 907 where it may be determined that the fail bit check operation has passed.

Figure 10:
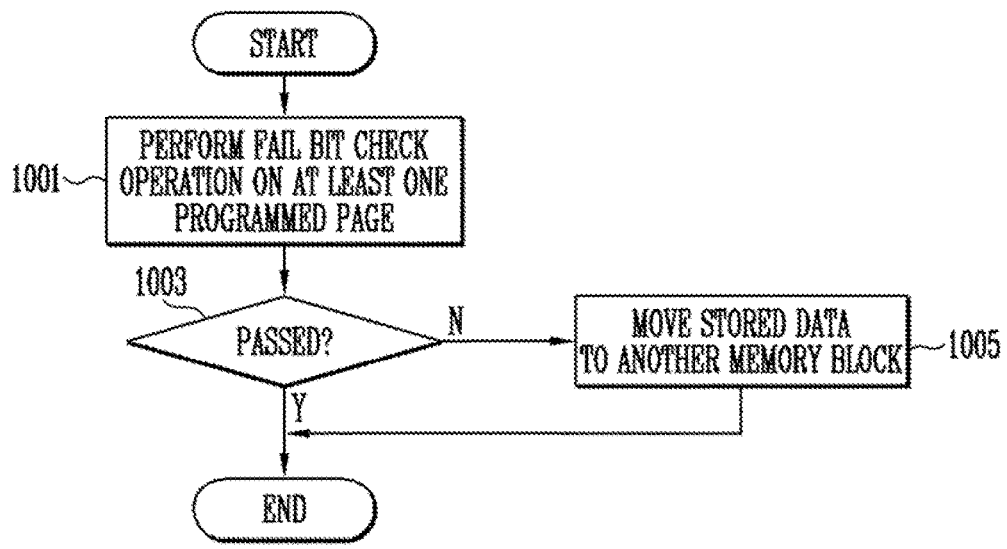
FIG. 10 is a flowchart showing a post program operation according to another embodiment of the present disclosure.

FIG. 10 is a flowchart showing a post program operation according to another embodiment of the present disclosure.

The embodiment of FIG. 10 relates to a first bit check operation that is performed after performing a program operation. Referring to FIG. 10, at step 1001, the controller may perform a fail bit check operation on at least one programmed page. A detailed description of the fail bit check operation that is performed after the program operation has been performed will be made later with reference to FIG. 11.

At step 1003, it is determined whether the fail bit check operation is passed. When the fail bit check operation is determined to be passed, the controller terminates the fail bit check operation. When the fail bit check operation is determined to be failed, the controller may control the semiconductor memory device to move data of the corresponding memory block to another memory block (i.e., a fresh memory block), at step 1005. The controller may transmit a read command for reading data of the failed memory block to the semiconductor memory device. Thereafter, the controller may transmit a program command and a program address to the semiconductor memory device to store the read data in a free block (i.e., a fresh memory block). Further, the controller may erase the failed memory block, and set the corresponding memory block as an erase state (not shown).

Figure 11:
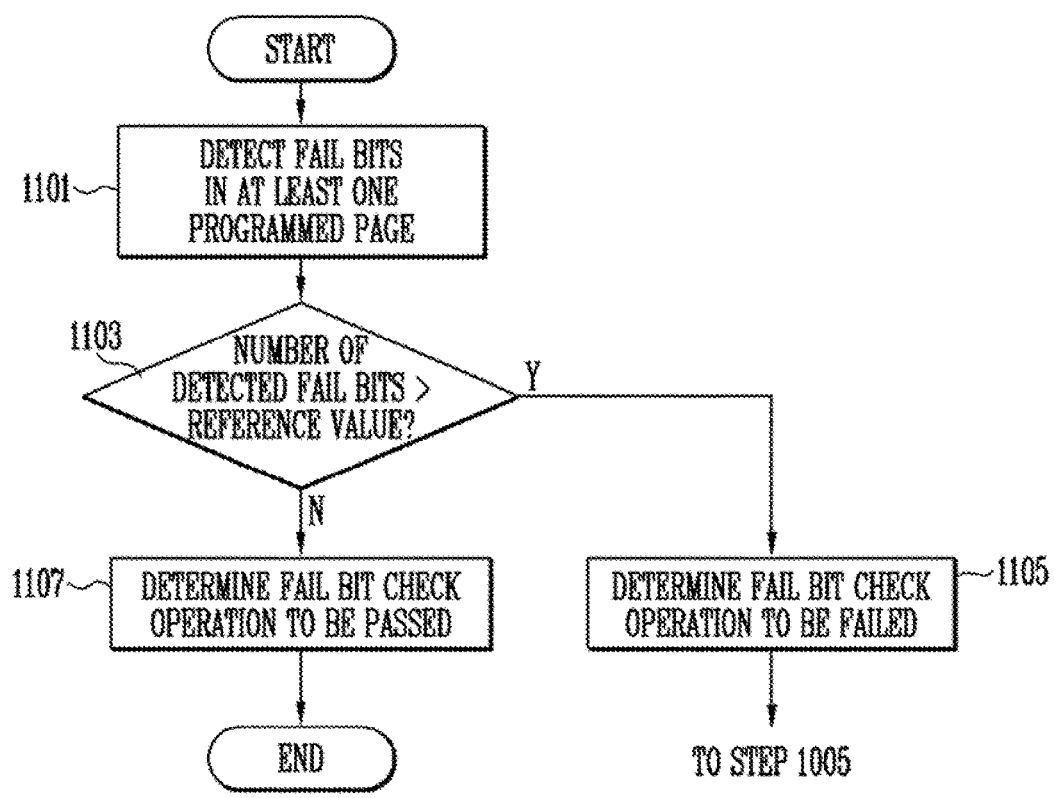
FIG. 11 is a detailed flowchart for describing a fail bit check operation of FIG. 10.

FIG. 11 is a detailed flowchart for describing the fail bit check operation of FIG. 10.

Referring to FIG. 11, at step 1101, the controller may detect fail bits in at least one programmed page. The controller may generate a read command for reading at least one programmed page to detect fail bits included therein, and transmit the generated read command to the semiconductor memory device.

In an embodiment, an operation of detecting fail bits may be performed on all or some of pages that are programmed through the program operation. When fail bits are detected in some pages, the controller may detect fail bits in the page programmed last in the corresponding memory block.

In accordance with an embodiment, a second fail check voltage may be applied to a selected word line during an operation for reading at least one programmed page. The second fail check voltage may have a voltage level required to verify a threshold voltage corresponding to an erase state. When a single memory cell is implemented as a triple level cell (TLC), the second fail check voltage may be a voltage for reading a logical page that is programmed last. For example, the second fail check voltage may be a voltage required to read a Most Significant Bit (MSB). Further, the second fail check voltage may be a first read voltage. The controller may receive the result of the read operation on the at least one programmed page using the second fail check voltage from the semiconductor memory device.

At step 1103, the controller may determine whether the number of detected fail bits is greater than the reference value. Here, as the reference value, the second reference value may be used. The second reference value indicates the number of fail bits per kilobyte (kB). For example, the second reference value may indicate 50 fail bits per kB. Further, the second reference value may be a value greater than the first reference value used in the fail bit check operation that is performed before performing the program operation.

As a result of the determination at step 1103, if the number of detected fail bits is greater than the second reference value, the controller may proceed to step 1105 where it may be determined that the fail bit check operation has failed. In contrast, if the number of detected fail bits is equal to or less than the second reference value, the controller proceeds to step 1107 where it may be determined that the fail bit check operation has passed.

Figure 12:
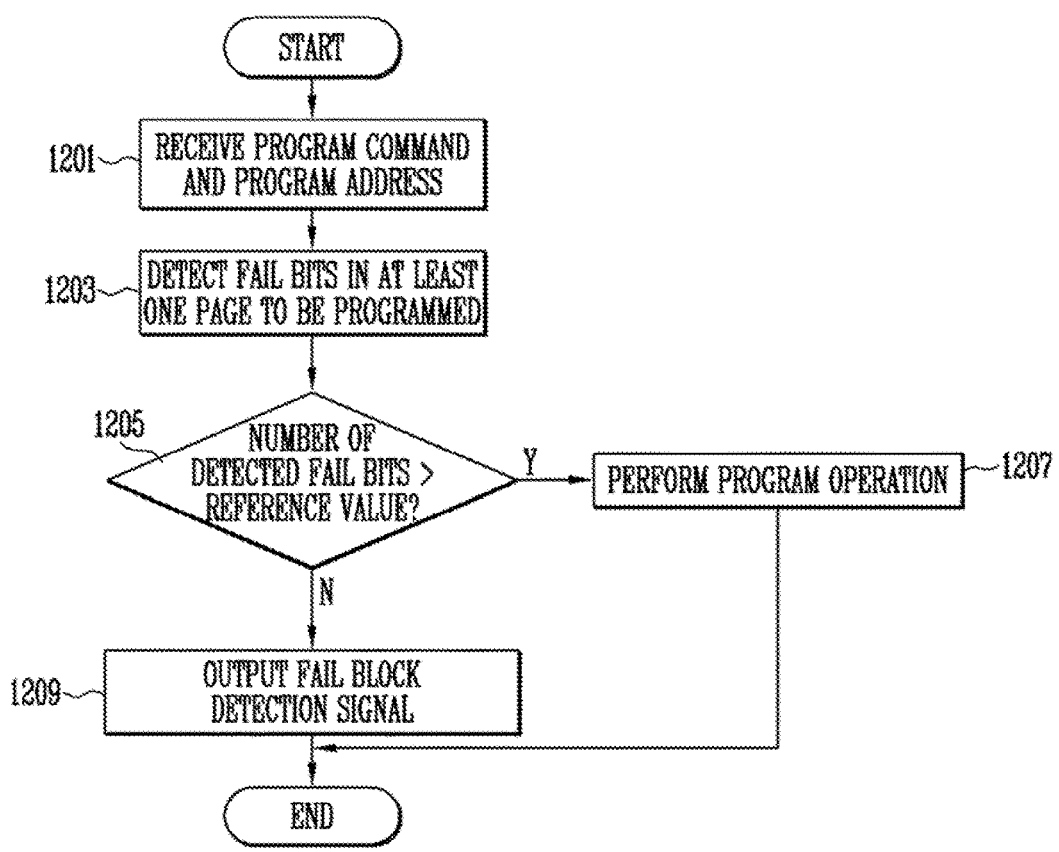
FIG. 12 is a flowchart illustrating an operation of a semiconductor memory device, according to an embodiment of the present disclosure.

FIG. 12 is a flowchart showing an operation of the semiconductor memory device according to an embodiment of the present disclosure.

The embodiment of FIG. 12, a controller transmits a program command and address, and performs a fail bit check operation on an open block before the semiconductor memory device applies a program voltage for performing a program operation, unlike the embodiments of FIGS. 9 and 10 in which the controller performs a fail bit check operation before a program operation in response to a program request from the host.

Referring to FIG. 12, at step 1201, the semiconductor memory device may receive a program command and a program address from the controller. The program address may be a physical block address. The physical block address may specify any one of the memory blocks included in the semiconductor memory device, and select least one page included in the corresponding memory block.

At step 1203, the semiconductor memory device may select at least one page to be programmed in response to the program address, and detect fail bits in the at least one page to be programmed. More specifically, the semiconductor memory device may read data from the at least one page to be programmed by applying a first fail check voltage to a selected word line. The first fail check voltage may have a voltage level required to verify a threshold voltage corresponding to an erase state.

At step 1205, the semiconductor memory device may determine whether the number of detected fail bits is greater than a first reference value. The semiconductor memory device may read the page selected using the first fail check voltage, and determine, based on the result of reading the selected page, whether the number of detected fail bits is greater than the reference value. As a result of the determination, if the number of detected fail bits is greater than the first reference value, the process proceeds to step 1207, whereas if the number of detected fail bits is equal to or less than the first reference value, the process proceeds to step 1209.

At step 1207, the semiconductor memory device may perform a program operation in response to the program command and the program address received at step 1201.

At step 1209, the semiconductor memory device may output a fail block detection signal, indicating that a memory block including the selected page is a fail block, to the controller.

When the fail block detection signal is received from the semiconductor memory device, the controller may set a memory block including the at least one page to be programmed as a closed block, re-generate a program address required to program data in another memory block, and transmit the re-generated program address to the semiconductor memory device. In an embodiment, the semiconductor memory device may store dummy data in the empty pages included in an open block to which the selected page belongs (not shown).

Figure 13:
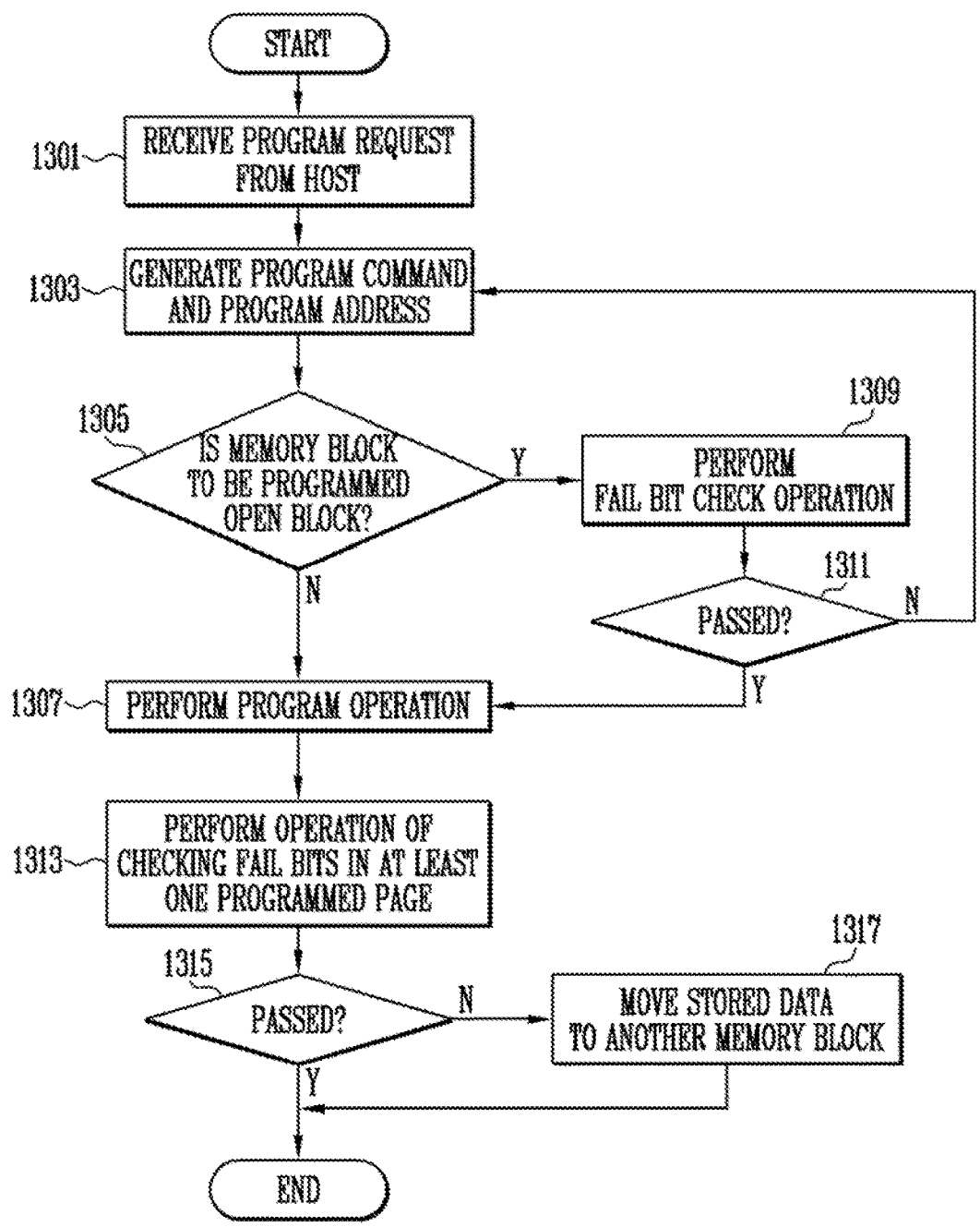
FIG. 13 is a diagram showing an operation of a memory system, according to another embodiment of the present disclosure.

FIG. 13 is a diagram showing an operation of a memory system according to another embodiment of the present disclosure.

More specifically, the embodiment of FIG. 13 shows the operations of the memory system that performs a fail bit check operation on at least one page to be programmed before performing a program operation, and performs another fail bit check operation on at least one programmed page.

In FIG. 13, steps 1301 to 1305 and 1309 to 1311 may be performed similarly to the steps 801 to 805 and 809 to 811 described above with reference to FIG. 8. Further, steps 1305 to 1311 may be performed according to the steps 1201 to 1209 by the semiconductor memory device, described above with reference to FIG. 12.

In FIG. 13, steps 1313 to 1317 may be performed similarly to the steps 1001 to 1005 described above with reference to FIG. 10.

In the embodiment, steps 1313 to 1317 may be performed based on the following description.

At step 1313, when the program operation is completed, the semiconductor memory device may perform a fail bit check operation on at least one programmed page. In an embodiment, an operation of detecting fail bits may be performed on all or some of pages that are programmed through the program operation. When fail bits are detected in some pages, the semiconductor memory device may detect fail bits in the page that is programmed last in the corresponding memory block.

In accordance with an embodiment, a second fail check voltage may be applied to a selected word line during an operation of reading at least one programmed page. The second fail check voltage may have a voltage level required to verify a threshold voltage corresponding to an erase state. When a single memory cell is implemented as a triple level cell (TLC), the second fail check voltage may be a voltage for reading a logical page that is programmed last. For example, the second fail check voltage may be a read voltage for reading a Most Significant Bit (MSB). Further, the second fail check voltage may be a first read voltage.

At step 1315, the semiconductor memory device may determine whether the number of detected fail bits is greater than a reference value. Here, as the reference value, a second reference value may be used. The second reference value indicates the number of fail bits per kilobyte (kB). For example, the second reference value may indicate 50 fail bits per kB. Further, the second reference value may be a value greater than the first reference value used in the fail bit check operation that is performed before performing the program operation.

When the number of fail bits is greater than the second reference value, the semiconductor memory device may output a fail block detection signal, indicating that a memory block including the selected page is a fail block, to the controller.

At step 1317, the controller may perform an operation of moving data of the memory block including the at least one programmed page to another memory block, and set the corresponding memory block as a bad block. In an embodiment, the controller may erase the corresponding memory block, and set the memory block as an erase state. When the number of fail bits in at least one programmed page is equal to or less than the second reference value, the semiconductor memory device terminates the operation.

Figure 14:
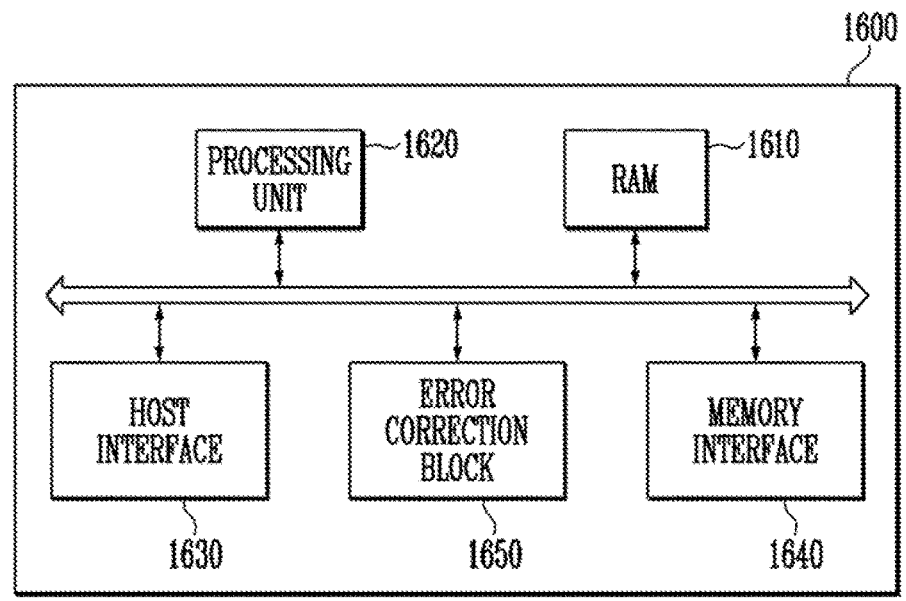
FIG. 14 is a block diagram showing a configuration example of the controller of FIG. 1.

FIG. 14 is a block diagram showing an embodiment of the controller of FIG. 1.

Referring to FIG. 14, a controller 1600 includes a RAM (random access memory) 1610, a processing unit 1620, a host interface 1630, a memory interface 1640, and an error correction (ECC) block 1650.

The processing unit 1620 controls the overall operation of the controller 1600. The RAM 1610 may be used as at least one of an operation memory of the processing unit 1620, a cache memory between the semiconductor memory device and the host, and a buffer memory between the semiconductor memory device and the host. The processing unit 1620 may implement the firmware and thus perform the function of the processor 220 described with reference to FIG. 3.

The host interface 1630 includes a protocol for performing data exchange between the host and the controller 1600. In an embodiment, the controller 1600 may communicate with the host through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol, a private protocol, and the like.

The memory interface 1640 interfaces with the semiconductor memory device.

The error correction block 1650 may decode, using an error correction code, data received from the semiconductor memory device.

Figure 15:
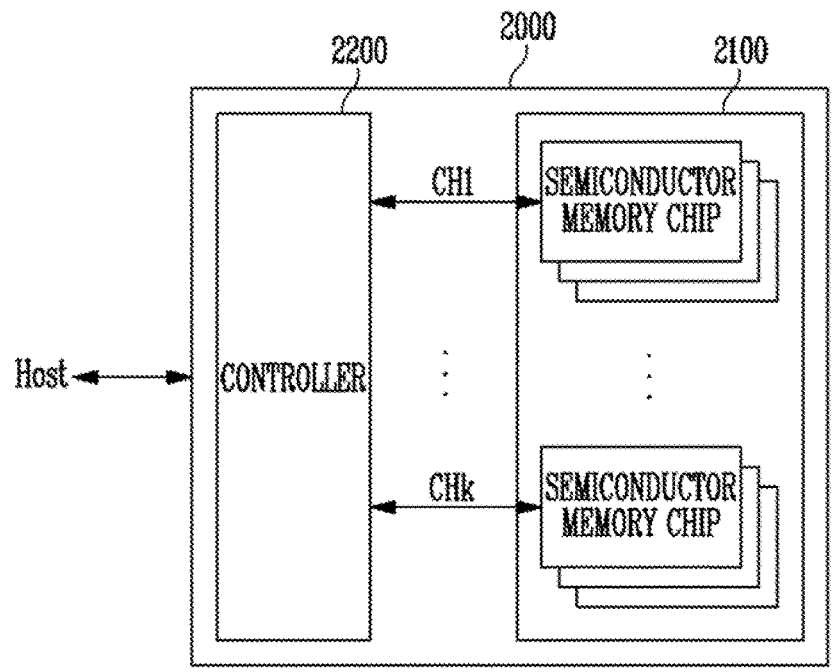
FIG. 15 is a block diagram showing an application example of a memory system including the controller of FIG. 14, according to an embodiment of the present invention.

FIG. 15 is a block diagram showing an example of application of the memory system including the controller of FIG. 14.

Referring to FIG. 15, a memory system 2000 includes the semiconductor memory device 2100 and a controller 2200. The semiconductor memory device 2100 includes a plurality of memory chips. The semiconductor memory chips are divided into a plurality of groups.

In FIG. 15, it is illustrated that the groups respectively communicate with the controller 2200 through first to k-th channels CH1 to CHk. Each semiconductor memory chip may be configured and operated in the same manner as those of the semiconductor memory device 100 described with reference to FIG. 4.

Each group may communicate with the controller 2200 through a single common channel. The controller 2200 may have the same configuration as that of the controller 200 described with reference to FIG. 3 and control the memory chips of the semiconductor memory device 2100 through the channels CH1 to CHk. In FIG. 15, a plurality of semiconductor memory chips are illustrated as being coupled to each channel. However, it will be understood that the memory system 2000 may be modified such that a single memory chip is coupled to each channel.

The controller 2200 and the semiconductor memory device 2100 may be integrated into a single semiconductor device. In an embodiment, the controller 2200 and the semiconductor memory device 2100 may be integrated into a single semiconductor device to form a memory card. For example, the controller 2200 and the semiconductor memory device 2100 may be integrated into a single semiconductor device and form a memory card such as a personal computer memory card international association (PCM-CIA), a compact flash card (CF), a smart media card (SM or SMC), a memory stick multimedia card (MMC, RS-MMC, or MMCmicro), a SD card (SD, miniSD, microSD, or SDHC), a universal flash storage (UFS), or the like.

The controller 2200 and the semiconductor memory device 2100 may be integrated into a single semiconductor device to form a solid state drive (SSD). When the memory system is used as the SSD, an operation speed of the host coupled to the memory system 2000 may be phenomenally improved.

In another embodiment, the memory system 2000 may be provided as one of various elements of an electronic device such as a computer, a ultra mobile PC (UMPC), a workstation, a net-book, a personal digital assistants (PDA), a portable computer, a web tablet, a wireless phone, a mobile phone, a smart phone, an e-book, a portable multimedia player (PMP), a game console, a navigation device, a black box, a digital camera, a 3-dimensional television, a digital audio recorder, a digital audio player, a digital picture recorder, a digital picture player, a digital video recorder, a digital video player, a device capable of transmitting/receiving information in an wireless environment, one of various devices for forming a home network, one of various electronic devices for forming a computer network, one of various electronic devices for forming a telematics network, an RFID device, one of various elements for forming a computing system, or the like.

In an exemplary embodiment, the semiconductor memory device 2100 or the memory system 2000 may be embedded in various types of packages. For example, the semiconductor memory device 2100 or the memory system 2000 may be packaged in a type such as Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flat-pack (TQFP), System In Package (SIP), Multi Chip Package (MCP), Wafer-level Fabricated Package (WFP), Wafer-Level Processed Stack Package (WSP), or the like.

Figure 16:
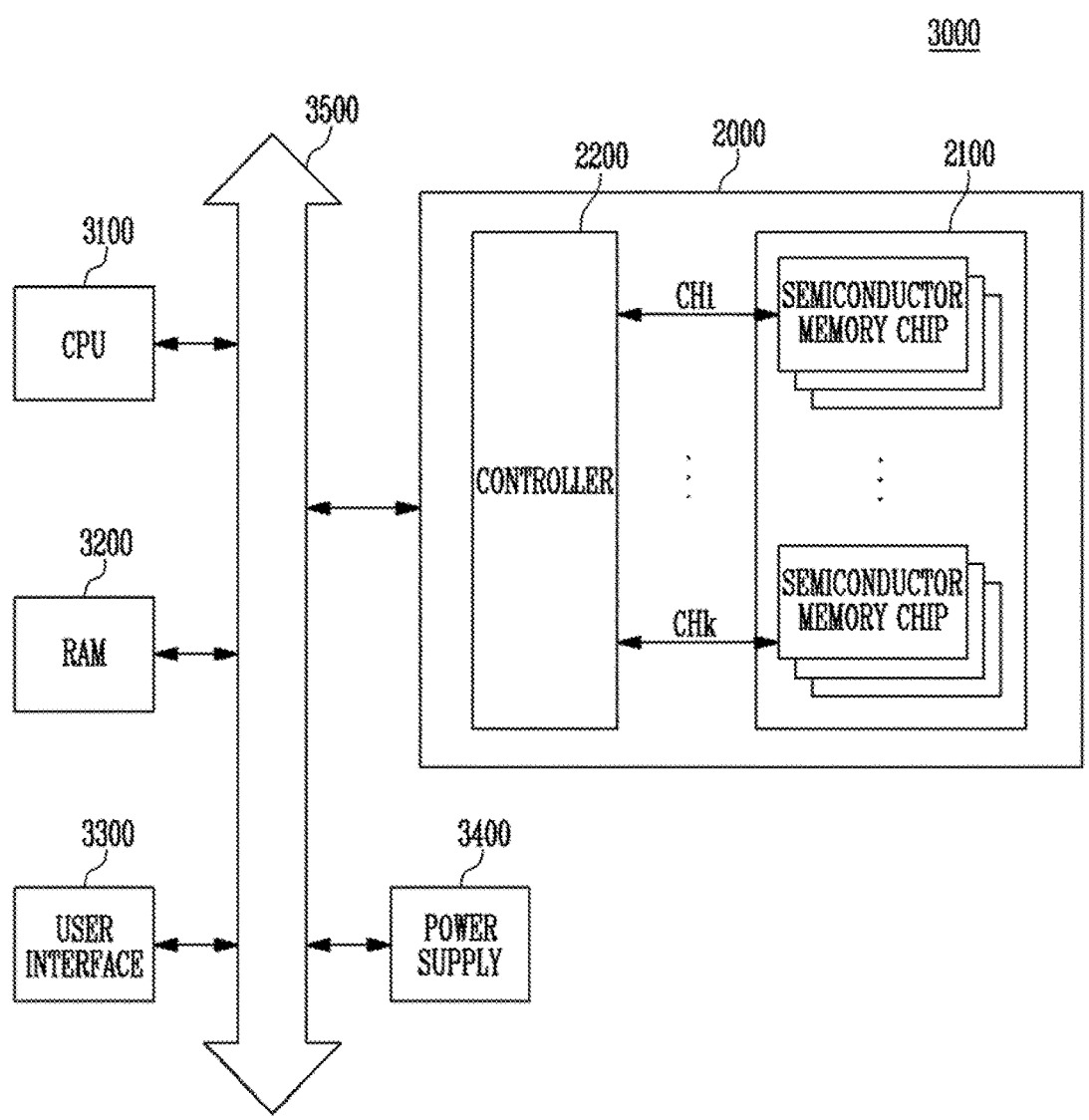
FIG. 16 is a block diagram showing a computing system including the memory system described with reference to FIG. 15, according to an embodiment of the present invention.

FIG. 16 is a block diagram showing a computing system including the memory system illustrated with reference to FIG. 15.

Referring to FIG. 16, a computing system 3000 includes a central processing unit (CPU) 3100, a RAM 3200, a user interface 3300, a power supply 3400, a system bus 3500, and a memory system 2000.

The memory system 2000 is electrically coupled to the CPU 3100, the RAM 3200, the user interface 3300, and the power supply 3400 through the system bus 3500. Data provided through the user interface 3300 or processed by the CPU 3100 may be stored in the memory system 2000.

In FIG. 16, the semiconductor memory device 2100 is illustrated as being coupled to the system bus 3500 through the controller 2200. However, the semiconductor memory device 2100 may be directly coupled to the system bus 3500. The function of the controller 2200 may be performed by the CPU 3100 and the RAM 3200.

In FIG. 16, the memory system 2000 described with reference to FIG. 15 is illustrated as being used. However, the memory system 2000 may be replaced with the memory system 50 described with reference to FIG. 1. In an embodiment, the computing system 3000 may include all of the memory systems 1000 and 2000 described with reference to FIGS. 1 and 15.

In accordance with embodiments of the present disclosure, there are provided a memory system and a method of operating the memory system, which have improved reliability.

Although the exemplary embodiments of the present disclosure have been disclosed, those skilled in the art will appreciate that various modifications, additions and substitutions are possible, without departing from the scope and spirit of the present disclosure.

Therefore, the scope of the present disclosure must be defined by the appended claims and equivalents of the claims rather than by the description preceding them.

In the above-discussed embodiments, all steps may be selectively performed or skipped. In addition, the steps in each embodiment may be not always performed in regular order. Furthermore, the embodiments disclosed in the present specification and the drawings just aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of operating a controller for controlling a semiconductor memory device including a plurality of memory blocks, the method comprising:
   generating a program command and a program address for performing a program operation on at least one page included in an open block, among the plurality of memory blocks;
   reading data from the at least one page corresponding to the program address; and
   transmitting the program command and the program address to the semiconductor memory device when a number of fail bits included in data read from the at least one page is equal to or less than a first reference value.

2. The method according to claim 1, further comprising:
   generating a program command and a program address for performing a program operation on memory blocks other than the open block when the number of fail bits included in the page data is greater than the first reference value.

3. The method according to claim 2, further comprising:
   programming dummy data in at least one empty page included in the open block; and
   setting the open block as a closed block.

4. The method according to claim 1, wherein the first reference value indicates a preset number of fail bits per kilobyte (kB).

5. The method according to claim 1, wherein the at least one page corresponds to a word line adjacent to any one of a drain select line and a source select line of the open block.

6. The method according to claim 1, wherein the reading of the data from the at least one page comprises:
   transmitting a read command for the at least one page to the semiconductor memory device; and
   receiving data, obtained by reading the data from the at least one page using a first fail check voltage, from the semiconductor memory device.

7. The method according to claim 6, wherein the first fail check voltage has a voltage level for verifying a threshold voltage corresponding to an erase state.

8. The method according to claim 1, further comprising:
   reading data from at least one programmed page when the program operation based on the program command is completed; and
   moving data of a memory block including the at least one programmed page to a memory block other than the open block when a number of fail bits included in data read from the at least one programmed page is greater than a second reference value.

9. The method according to claim 8, wherein the second reference value has a value greater than the first reference value.

10. The method according to claim 8, wherein the reading of the data from at least one programmed page comprises:
    transmitting a read command for the at least one programmed page to the semiconductor memory device; and
    receiving data, obtained by reading data from the at least one programmed page using a second fail check voltage, from the semiconductor memory device.

11. The method according to claim 10, wherein the second fail check voltage is a read voltage for classifying states of memory cells included in the at least one programmed page into an erase state and a program state.

12. The method according to claim 8, wherein the at least one programmed page is programmed last in the program operation, among a plurality of pages included in the open block.

13. A controller for controlling a semiconductor memory device including a plurality of memory blocks, the controller comprising:
    a processor configured to generate a first program command and a first program address for performing a program operation on at least one page included in an open block among the plurality of memory blocks, to read data from the at least one page corresponding to the program address and to transmit the program command and the program address to the semiconductor memory device according to a number of fail bits included in data read from the at least one page; and
    a memory interface configured to communicate with the semiconductor memory device according to a control of the processor.

14. The controller according to claim 13,
    wherein the processor generates a second program command and a second program address for performing a program operation on a memory block other than the open block among the plurality of memory blocks when the number of fail bits included in data read from the at least one page is greater than a first reference value.

15. The controller according to claim 14, further comprising:
a memory block management unit configured to manage memory block state information indicating states of the plurality of memory blocks,
wherein:
the processor programs dummy data in at least one empty page included in the open block, and
the memory block management unit sets the open block as a closed block.

16. The controller according to claim 13,
wherein the processor transmits the first program command and the first program address to the semiconductor memory device when the number of fail bits included in data read from the at least one page is equal to or less than a first reference value, reads data from at least one page included in the open block after the program operation is performed, and moves data of the open block to a memory block other than the open block when a number of fail bits included in data read from the at least one page included in the open block after the program operation is performed is greater than a second reference value.

17. The controller according to claim 16, wherein the second reference value has a value greater than the first reference value.

18. The controller according to claim 16, further comprising:
a memory block management unit configured to manage memory block state information indicating states of the plurality of memory blocks,
wherein:
the processor erases the open block after the data of the open block is moved to the memory block other than the open block, and
the memory block management unit sets the open block as a free block.

* * * * *